United States Patent
Tahara et al.

(10) Patent No.: US 7,736,235 B2
(45) Date of Patent: *Jun. 15, 2010

(54) GAME SYSTEM FOR VARYING PARAMETER OF A CHARACTER

(75) Inventors: Kouzou Tahara, Kyoto (JP); Kenta Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 43 days.

This patent is subject to a terminal disclaimer.

(21) Appl. No.: 12/068,907

(22) Filed: Feb. 13, 2008

(65) Prior Publication Data

US 2008/0153601 A1    Jun. 26, 2008

Related U.S. Application Data

(63) Continuation of application No. 10/879,071, filed on Jun. 30, 2004, now Pat. No. 7,374,490.

(30) Foreign Application Priority Data

Jan. 20, 2004    (JP)    .............. 2004-012460

(51) Int. Cl.
A63F 9/24 (2006.01)
A63F 13/00 (2006.01)
G06F 17/00 (2006.01)
G06F 19/00 (2006.01)

(52) U.S. Cl. .............. 463/43; 463/30; 463/31; 463/37; 463/44

(58) Field of Classification Search ............ 463/30, 463/31, 37, 43, 44
See application file for complete search history.

(56) References Cited

U.S. PATENT DOCUMENTS

| | | | |
|---|---|---|---|
| 4,353,552 A | 10/1982 | Pepper, Jr. ............ | 273/85 |
| 4,738,451 A * | 4/1988 | Logg ............ | 463/2 |
| 5,325,447 A | 6/1994 | Vogt, III | |
| 5,604,855 A * | 2/1997 | Crawford ............ | 345/473 |
| 5,634,850 A * | 6/1997 | Kitahara et al. ............ | 463/33 |
| 5,889,506 A | 3/1999 | Lopresti et al. ............ | 345/158 |
| 5,951,397 A * | 9/1999 | Dickinson ............ | 463/36 |
| 6,042,478 A | 3/2000 | Ng ............ | 463/44 |
| 6,104,317 A * | 8/2000 | Panagrossi ............ | 341/20 |
| 6,152,821 A * | 11/2000 | Nakagawa et al. ............ | 463/4 |

(Continued)

FOREIGN PATENT DOCUMENTS

EP    477775 A * 4/1992

(Continued)

OTHER PUBLICATIONS

Communication issued Aug. 19, 2008 in corresponding European Application No. 04 015 210.0-2218.

(Continued)

*Primary Examiner*—John M Hotaling, II
*Assistant Examiner*—Adetokunbo Torimiro
(74) *Attorney, Agent, or Firm*—Nixon & Vanderhye, PC

(57) ABSTRACT

A game apparatus generates a game image for display on a display screen. A size and a shape of an attack input supplied to the game apparatus is determined and one or more characteristics of an attacked game character is changed based on one or both of the size and shape of the supplied attack input.

25 Claims, 26 Drawing Sheets

U.S. PATENT DOCUMENTS

| | | | |
|---|---|---|---|
| 6,215,901 | B1 | 4/2001 | Schwartz |
| 6,279,000 | B1* | 8/2001 | Suda et al. .................... 707/10 |
| 6,319,130 | B1* | 11/2001 | Ooseki et al. ................. 463/43 |
| 6,542,155 | B1* | 4/2003 | Mifune et al. ............... 345/428 |
| 6,616,703 | B1* | 9/2003 | Nakagawa .................. 715/201 |
| 6,648,760 | B1 | 11/2003 | Nicastro ...................... 463/23 |
| 6,716,103 | B1 | 4/2004 | Eck et al. ..................... 463/45 |
| 2001/0041615 | A1* | 11/2001 | Kondo ......................... 463/40 |
| 2002/0023265 | A1* | 2/2002 | Metcalf ....................... 725/74 |
| 2002/0033795 | A1 | 3/2002 | Shahoian et al. ............ 345/156 |
| 2002/0068626 | A1* | 6/2002 | Takeda et al. ................ 463/30 |
| 2003/0003978 | A1 | 1/2003 | Tsuchida |
| 2003/0013529 | A1 | 1/2003 | Miura et al. |
| 2003/0045355 | A1 | 3/2003 | Comair ........................ 463/40 |
| 2004/0053690 | A1 | 3/2004 | Fogel et al. .................. 463/31 |
| 2004/0176170 | A1 | 9/2004 | Eck et al. ..................... 463/43 |

FOREIGN PATENT DOCUMENTS

| | | |
|---|---|---|
| JP | 5-225396 | 9/1993 |
| JP | 5-261180 | 10/1993 |
| JP | 8-173633 | 7/1996 |
| JP | 11-276716 | 10/1999 |
| JP | 2000-137576 | 5/2000 |
| JP | 2002-000939 | 1/2002 |
| JP | 2002-35411 | 2/2002 |
| JP | 2002-282542 | 10/2002 |
| JP | 2003-79943 | 3/2003 |
| JP | 2003-103051 | 4/2003 |
| JP | 2003-154170 | 5/2003 |
| WO | WO 03/023696 | 3/2003 |

OTHER PUBLICATIONS

Office Action issued Jun. 13, 2008 in corresponding Japanese Application No. 2004-12460.

LOGiN, Enterbrain, Inc., Sep. 1, 2003, vol. 22, No. 9, pp. 170-171 (partial translation).

LOGiN, Enterbrain, Inc., Jan. 1, 2004, vol. 23, No. 1, pp. 90-92 (partial translation).

LOGiN, Enterbrain, Inc., Aug. 1, 2000, vol. 19, No. 8, p. 22 (partial translation).

"Final Fantasy IV" for Wonderswan Color version, V-jump Books [Game Series], Shueisha Inc., Japan, Apr. 2, 2002, $1^{st}$ edition, p. 26, ISBN4-08-779161-0 (with partial translation).

Office Action for JP 2004-012460, Sep. 12, 2007.

David A. Dodson, "Catch a New Wave", Eye Candy http://www.viewonline.com/pges/articles/tapwavezodiac.htm (2004).

PGNx Media "Hardware Review: Tapwave Zodiac 1", http://www.pgnx.net/articles.php?page=full&id=5762 (Aug. 19, 2004).

Nintendo.ca: Press Release, "Nintendo DS Lets Players Touch the Future", http://www.nintendo.ca/cgi-bin/usersite/display_info.cgi?lang=en&pageNum=9&id=7644861 (May 11, 2004).

PCWorld.com, "Sony, Nintendo Unveil Game Handhelds", http://www.pcworld.com/resource/printable/article/0,aid,116101,00.asp (Jul. 31, 2004).

ConsumerGuide, "Tapwave Zodiac PDA/Gaming Device Review, Rating & Prices Personal Digital Assistants (PDAs)", http://products.consumerguide.com/cp/electronics/review/index.cfm/id/26877 (2004).

Vidgame.net "Tiger Game.com", http://www.vidgame.net/TIGER/GC.html (Jun. 26, 2003).

* cited by examiner

| DATA NOS. | VECTOR DATA | | |
|---|---|---|---|
| | DISTANCE | DIRECTION CODE | VECTOR |
| 1 | 2 | 5 | ↙ |
| 2 | 3 | 5 | ↙ |
| 3 | 2 | 5 | ↙ |
| 4 | 3 | 5 | ↙ |
| 5 | 3 | 2 | → |
| ⋮ | ⋮ | ⋮ | ⋮ |
| n | 4 | 7 | ↖ |

F I G. 1 8

| DATA NOS. | VECTOR DATA | | |
|---|---|---|---|
| | DISTANCE | DIRECTION | VECTOR |
| 1 | 10 | 5 | ↙ |
| 2 | 10 | 2 | → |
| 3 | 10 | 7 | ↖ |

FIG. 19

| REFERENCE GRAPHICS DATABASE | |
|---|---|
| SHAPE | REFERENCE GRAPHICS DATA |
| RECTANGLE | REFERENCE GRAPHICS DATA A |
| CIRCLE | REFERENCE GRAPHICS DATA B |
| TRIANGLE | REFERENCE GRAPHICS DATA C |
| ⋮ | ⋮ |

| REFERENCE GRAPHICS DATA (RECTANGLE) | | | |
|---|---|---|---|
| DATA NOS. | DISTANCE | DIRECTION | VECTOR |
| 1 | 1 | 4 | ↓ |
| 2 | 1 | 2 | → |
| 3 | 1 | 0 | ↑ |
| 4 | 1 | 6 | ← |

| REFERENCE GRAPHICS DATA (CIRCLE) | | | |
|---|---|---|---|
| DATA NOS. | DISTANCE | DIRECTION | VECTOR |
| 1 | 1 | 5 | ↙ |
| 2 | 1 | 4 | ↓ |
| 3 | 1 | 3 | ↘ |
| 4 | 1 | 2 | → |
| 5 | 1 | 1 | ↗ |
| 6 | 1 | 0 | ↑ |
| 7 | 1 | 7 | ↖ |
| 8 | 1 | 6 | ← |

| REFERENCE GRAPHICS DATA (TRIANGLE) | | | |
|---|---|---|---|
| DATA NOS. | DISTANCE | DIRECTION | VECTOR |
| 1 | 1 | 5 | ↙ |
| 2 | 1 | 2 | → |
| 3 | 1 | 7 | ↖ |

FIG. 20

| SHAPE | STYLE OF ATTACK | BASIC DAMAGE | MAGNIFICATION CORRESPONDING TO SIZE OF INPUT TRAJECTORY ||||| MAGNIFICATION CORRESPONDING TO ATTRIBUTE OF ENEMY TO ATTACK |||
|---|---|---|---|---|---|---|---|---|---|---|
| | | | 1' | ~2' | ~3' | ~5' | | FIRE ATTRIBUTE | WATER ATTRIBUTE | ... |
| CIRCLE | FIRE MAGIC | 30 | ×3 | ×1 | ×0.5 | ×0.2 | | ×0.7 | ×1.5 | ... |
| RECTANGLE | WATER MAGIC | 30 | ×3 | ×1 | ×0.5 | ×0.2 | | ×2 | ×0.7 | ... |
| TRIANGLE | WIND MAGIC | 30 | ×3 | ×1 | ×0.5 | ×0.2 | | ×3 | ×2 | ... |
| ... | ... | ... | ... | ... | ... | ... | | ... | ... | ... |

FIG. 22

| ENEMY CHARACTERS | ATTRIBUTES | HP | MP |
|---|---|---|---|
| ENEMY CHARACTER A | WATER | 37 | 14 |
| ENEMY CHARACTER B | FIRE | 50 | 30 |
| ⋮ | ⋮ | ⋮ | ⋮ |

GAME SYSTEM FOR VARYING PARAMETER OF A CHARACTER

CROSS-REFERENCE TO RELATED APPLICATION

This application is a continuation of application Ser. No. 10/879,071, filed Jun. 30, 2004, now U.S. Pat. No. 7,374,490.

BACKGROUND AND SUMMARY

Conventionally, there have been proposed game apparatuses which can be operated using an input device other than a controller having a cross-key pad and buttons. For example, there is a conventional game system for playing a game using a sword-like controller to attack enemy characters in the game. In this game system, a position of the sword-like controller and an amount of variation in the position per unit of time are detected by a sensor, and a degree of damage caused to an enemy character by attack is determined in accordance with the speed or amplitude of swing of the sword-like controller. In such a conventional game system, the player is able to feel as if he/she is attacking the enemy characters in the game using a real sword.

In the above conventional game system, the degree of damage caused to an enemy character is determined in accordance with the speed or amplitude of swing of the sword-like controller, and the means of attacking the enemy characters is limited to a sword, lacking variation in attack. Such simple means of attacking makes the game itself monotonous, easily boring the player.

Specifically, one input operation uniquely makes one type of attack action, and therefore the game easily bores the player. It is important in particular for new games to enable a variety of types of attacks including, for example, not only a direct attack by a sword but also an attack by magic, and also to enable a damage degree and an area affected by an attack to be designated, thereby keeping the player from becoming bored with the game.

Therefore, an aspect of an exemplary illustrative embodiment is a game system which enables various game operations to provide a player with an opportunity to play a game in various manners.

The exemplary illustrative embodiments herein have the following features to attain the aspect mentioned above. It should be noted that reference numerals and supplemental remarks in parentheses merely indicate correspondence with a preferred embodiment which will be described further below for the purpose of better understanding of the exemplary illustrative embodiments, and do not restrict the scope of the present invention.

A first aspect of an exemplary illustrative embodiment is directed to a computer-readable storage medium having a game program stored therein, the game program causing a computer of a game apparatus (1), which includes a display screen (a first LCD 11) for displaying a game image and a touch panel (13) provided on the display screen, to implement a method comprising: a game image display control step (a CPU core 21 implementing steps S41; hereinafter, only step numbers are shown); a coordinate detection step (S53); a shape identification step (S64); a size calculation step (S66); a basic condition determination step (S65); an effectiveness determination step (S67); and a characteristic parameter change step (S77). The game image display control step allows a game image comprising one or more game characters (enemy characters 31 and 32) to be displayed on the display screen. The coordinate detection step detects a coordinate value at predetermined time intervals, the coordinate value indicating a position on the touch panel where a player's input is provided. The shape identification step identifies a graphical shape of an input trajectory represented by a coordinate value group (an input coordinate list 22a) detected by the coordinate detection step. The size calculation step calculates a size of the graphical shape of the input trajectory represented by the coordinate value group detected by the coordinate detection step. The basic condition determination step determines a basic condition (an attack style) for changing a characteristic parameter (HP or MP of an enemy character), which indicates a characteristic of a game character, based on the graphical shape identified by the shape identification step. The effectiveness determination step determines an effectiveness of the basic condition for the game character based on the size calculated by the size calculating step. The characteristic parameter change step changes the characteristic parameter of the game character based on the basic condition determined by the condition determination step and the effectiveness determined by the effectiveness determination step.

Further, the method may further comprise a character selection step (S71). The character selection step selects at least one game character having a character parameter to be changed, from among the one or more game characters comprising the game image. In this case, the characteristic parameter change step changes only the characteristic parameter of the at least one game character selected by the character selection step.

A second aspect of an exemplary illustrative embodiment is directed to a computer-readable storage medium having a game program stored therein, the game program causing a computer of a game apparatus (1), which includes a display screen for displaying a game image and a touch panel (13) provided on the display screen (a first LCD 11), to implement a method comprising: a game image display control step (S41); a coordinate detection step (S53); a shape identification step (S64); a character selection step (S71); a basic condition determination step (S65); and a characteristic parameter change step (S77). The game image display control step allows a game image comprising game characters (enemy characters 31 and 32) to be displayed on the display screen. The coordinate detection step detects a coordinate value at predetermined time intervals, the coordinate value indicating a position on the touch panel where a player's input is provided. The shape identification step identifies a graphical shape of an input trajectory represented by a coordinate value group (an input coordinate list 22a) detected by the coordinate detection step. The character selection step selects at least one game character having a characteristic parameter (HP or MP of an enemy character), which indicates a characteristic of the game character and is required to be changed, from among the game characters comprising the game image based on an area on the display screen which is defined by the input trajectory. The basic condition determination step determines a basic condition (e.g. an attach style) for changing the characteristic parameter, which indicates the characteristic of the game character, based on the graphical shape identified by the shape identification step. The characteristic parameter change step changes the characteristic parameter of the at least one game character selected by the character selection step, based on the basic condition determined by the condition determination step.

Further, the method may further comprise a size calculation step (S66) and an effectiveness determination step (S67). The size calculation step calculates a size of the graphical shape of the input trajectory represented by the coordinate value group detected by the coordinate detection step. The effectiveness determination step determines an effectiveness of the basic condition for the at least one game character based on the size calculated by the size calculating step. In this case, the characteristic parameter change step changes the characteristic parameter of the at least one game character based on the effectiveness of the basic condition determined by the effectiveness determination step.

Furthermore, the characteristic parameter change step may change a degree of change in the characteristic parameter in accordance with a number of the at least one game character selected by the character selection step.

Further still, the method may further comprise a change representation addition step (S76). The change representation addition step changes the game image in a different manner in accordance with a type of the basic condition determined by the graphical shape of the input trajectory after the graphical shape of the input trajectory is identified by the shape identification step.

Further still, the method may further comprise a trajectory display control step (S56). The trajectory display control step displays the input trajectory in a position on the display screen which corresponds to the coordinate value detected by the coordinate detection step.

Further still, a plurality of pieces of reference graphics data indicating types of the basic condition and predetermined shapes may be stored in the game apparatus. In this case, the shape identification step selects a piece of reference graphics data, which indicates a shape most analogous to a shape represented by the coordinate value group, from among the plurality of pieces of reference graphics data stored in the game apparatus, and then the shape identification step determines the shape represented by the selected piece of reference graphics data as the graphical shape of the input trajectory.

Further still, the method may further comprise a vector data group calculation step and a correction step. The vector data group calculation step calculates a vector data group (a vector data list 22*b*) indicating a distance and a direction between sequential coordinate values based on the coordinate value group detected by the coordinate detection step. The correction step corrects a plurality of sequential pieces of vector data indicating a same direction and included in the vector data group, so as to be represented as a piece of vector data. In this case, the shape identification step selects a piece of reference graphics data indicating a shape most analogous to a shape of the vector data group (input trajectory data 22*c*) corrected by the correction step.

Note that an exemplary embodiment also provides a game apparatus comprising: a storage medium (a WRAM 22 or a cartridge (17) having the above game program stored therein; and a program implementing section (a CPU core 21) for implementing the game program stored in the storage medium.

In the first aspect, two elements, which comprise a basic condition for changing (increasing/decreasing) a characteristic parameter of a game character and an effectiveness of the basic condition, are determined based on a graphical shape and a size of an input trajectory provided in one input operation by the user. Accordingly, it is possible to make more diverse changes to the characteristic parameter by a simpler input operation. Moreover, the graphical shape is directly inputted via a touch panel on which the game character is displayed, and therefore it is possible for the user to more intuitively perform an input operation with higher accuracy. Note that the basic condition as described herein corresponds to, for example, the type of magic for attacking an enemy character, the type of attack other than the magic, an attack style including a combination of magic and an attack other than the magic, or the type of magic for recovering the player character's power. Thus, for example, in a battle game of attacking enemy characters, it is possible to realize more diverse attack styles based on the first aspect. That is, in the first aspect, various game operations are realized, whereby it is possible to provide a player with an opportunity to play a game in various manners. Moreover, it is possible to provide a game which allows the user to experience a feeling of operation which is intuitive and not monotonous compared to, particularly, a game system for use with a game with command input-type battle scenes.

In the case where the method further includes the character selection step, not all game characters displayed on the display screen are considered to have a character parameter to be changed, and a game character/game characters having a character parameter to be changed is/are determined by an area defined by an input trajectory on the display screen. That is, the game character/game characters having a character parameter to be changed is/are changed in accordance with an input position on the touch panel, and therefore more diverse game processes are provided in accordance with input operations, thereby making the game more enjoyable.

In the second aspect, two elements, which comprise a game character having a characteristic parameter to be changed and a basic condition for changing (increasing/decreasing) the characteristic parameter, are determined based on a graphical shape and a position of an input trajectory provided in one input operation by the user. Accordingly, it is possible to make more diverse changes to the characteristic parameter by a simpler input operation. Thus, in the second aspect, as in the first embodiment, for example, in a battle game of attacking enemy characters, it is possible to realize more diverse attack styles in accordance with diverse input operations via the touch panel. That is, in the second aspect, various game operations are realized, whereby it is possible to provide a player with an opportunity to play a game in various manners so as not to bore the user.

In the case where a degree of change in the characteristic parameter is changed in accordance with the number of game characters selected by the character selection step, the degree of the characteristic parameter is changed in accordance with not only the shape of the input trajectory, etc., but also the position of the game character on the display. Accordingly, the game unfolds differently each time the player performs the same input operation. Thus, it is possible to provide a player with an opportunity to play the game in various manners. Moreover, the player is required to pay attention to the position of the game character on the display screen, while performing the input operation, making the game more complex and difficult to play. Thus, it is possible to provide a game which is not monotonous and/or boring to the player.

Further, in the case where the method further includes the change representation addition step, it is possible to provide the player with a visual effect which varies in accordance with the basic condition, thereby making the game more enjoyable. That is, it is possible to present to the player a change of a game image in accordance with the graphical shape of the input trajectory. Moreover, the player is able to visually and intuitively know how the player him/herself is performing an input operation. Accordingly, the player is able to readily know whether the input operation is performed in a desired manner.

Furthermore, in the case where the method further includes the trajectory display control step, a result of the player's input operation is displayed on the display screen. Accordingly, the player is able to readily know how the player him/ herself is performing an input operation. Thus, the player is able to readily know whether the input operation is performed in a desired manner.

Further still, in the case where a plurality of pieces of reference graphics data are stored in the game apparatus, it is possible to readily identify a graphical shape of the input trajectory.

Further still, in the case where the method further includes the vector data group calculation step and the correction step, the shape of a trajectory drawn on the touch panel by the player is simplified by the correction step. Accordingly, it is possible to simplify a process for comparing the vector data group to the reference graphics data, thereby increasing the processing speed, while reducing a processing load on the computer.

BRIEF DESCRIPTION OF THE DRAWINGS

These and other features and advantages will be better and more completely understood by reference to the following detailed description of exemplary illustrative embodiments in conjunction with the drawings of which:

FIG. 12 is a diagram schematically showing how an input to a touch panel is performed;

FIG. 13 is a diagram showing an exemplary input coordinate list 22a;

FIG. 15A is a diagram used for explaining a process for simplifying the input coordinate list 22a;

FIG. 15B is another diagram used for explaining the process for simplifying the input coordinate list 22a;

FIG. 15C is still another diagram used for explaining the process for simplifying the input coordinate list 22a;

FIG. 16A is still another diagram used for explaining the process for simplifying the input coordinate list 22a;

FIG. 16B is still another diagram used for explaining the process for simplifying the input coordinate list 22a;

FIG. 18 is a diagram showing an example of input trajectory data 22c;

FIG. 19 is a diagram showing an example of a reference graphics database 22d;

FIG. 20 shows an exemplary attack determination table;

FIG. 22 is a diagram showing an example of enemy character status data;

DETAILED DESCRIPTION

Figure 1:
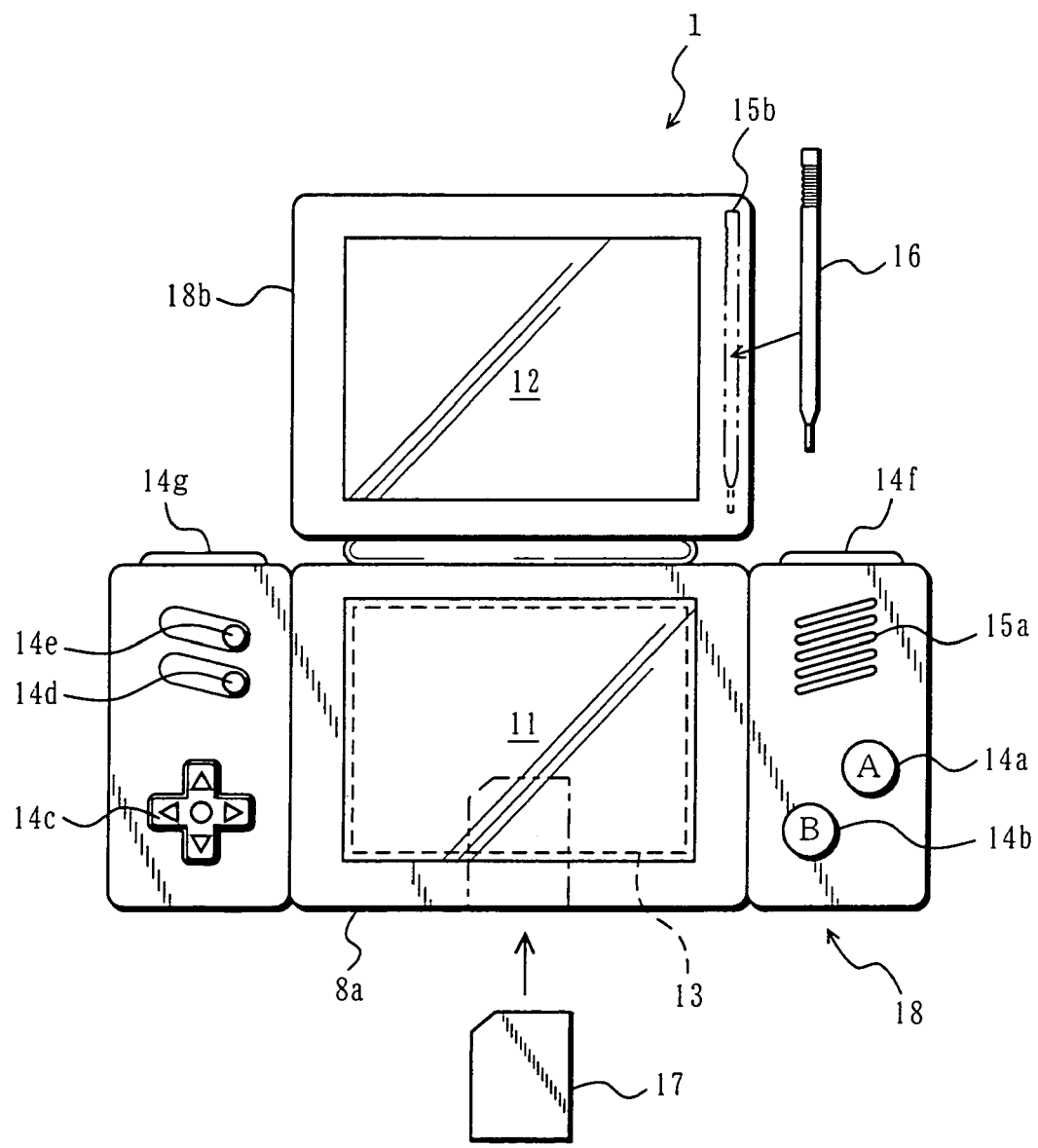
FIG. 1 is an external view of a portable game apparatus according to an exemplary illustrative embodiment.

FIG. 1 is an external view of a portable game apparatus according to an exemplary illustrative embodiment. In FIG. 1, a game apparatus 1 includes two liquid crystal displays (LCDS) 11 and 12 which are accommodated in a housing 18 so as to establish a predetermined positional relationship therebetween. Specifically, in order to accommodate the first and second LCDs 11 and 12 in a vertical direction, the housing 18 includes a lower housing 18a and an upper housing 18b. The upper housing 18b is supported on a portion of an upper side surface of the lower housing 18a so as to be freely flipped about that portion of the upper side surface of the lower housing 18a. The upper housing 18b has a planar shape slightly larger than the second LCD 12, and a top surface of the upper housing 18b has an opening to expose a display screen of the second LCD 12. The lower housing 18a has a planar shape wider than the upper housing 18b, and a top surface of the lower housing 18a has an opening substantially formed in its center so as to expose a display screen of the first LCD 11. The lower housing 18a has sound holes 15a for a loudspeaker 15 provided on one of two sides opposed to each other with respect to the first LCD 11, and also has elements of an operating switch section 14 provided on either one of the two sides.

Specifically, the operating switch section 14 includes operation switches 14a and 14b, a cross direction keypad 14c; a start switch 14d, and a select switch 14e. The operation switches 14a and 14b are provided on the top surface of the lower housing 18a so as to be located to the right of the first LCD 11. The cross direction key pad 14c, the start switch 14d, and the select switch 14e are provided on the top surface of the lower housing 18a so as to be located to the left of the first LCD 11. The operation switches 14a and 14b are used for inputting instructions to jump, punch, operate a weapon, and so on in an action game, or inputting instructions to obtain an item, select and determine a weapon or a command, and so on in a role playing game (RPG) such as a simulation RPG. The cross direction keypad 14c is used for indicating a moving direction on a game screen, e.g., a direction to move a player object (or a player character) which can be operated by the player, or a direction to move a cursor. If necessary, additional operation switches may be provided, or side switches 14f and 14g may be provided respectively on right and left sides of the upper side surface of the lower housing 18a as shown in FIG. 1.

Further, a touch panel 13 is provided on the first LCD 11 (as indicated by broken lines in FIG. 1). For example, the touch panel 13 may be of a resistive film type, an optical type (e.g. an infrared type), or a capacitive coupling type. When a stick 16 (or a finger) presses, strokes, or moves on the touch panel 13, the touch panel 13 detects a coordinate position of the stick 16 and outputs coordinate data.

The upper housing 18b has a storage hole 15b (indicated by two-dot dashed lines in FIG. 1) formed in the vicinity of a side surface thereof in order to store the stick 16 for operating the touch panel 13 as necessary. The lower housing 18a has a cartridge insertion portion (indicated by one-dot dashed lines in FIG. 1) in a side surface thereof in order to freely load/unload a game cartridge 17. The cartridge 17 includes an information storage medium, e.g., a nonvolatile semiconductor memory such as a ROM or a flash memory, and has a game program recorded in the information storage medium. The cartridge insertion portion includes a connector (see FIG. 2) for electrically connecting the cartridge 17 to the game apparatus 1. The lower housing 18a (or the upper housing 18b) accommodates an electronic circuit board having mounted thereon various electronics including a CPU. Note that the information storage medium having a game program stored therein is not limited to the nonvolatile semiconductor memory, and may be an optical disk such as a CD-ROM or a DVD.

Figure 2:
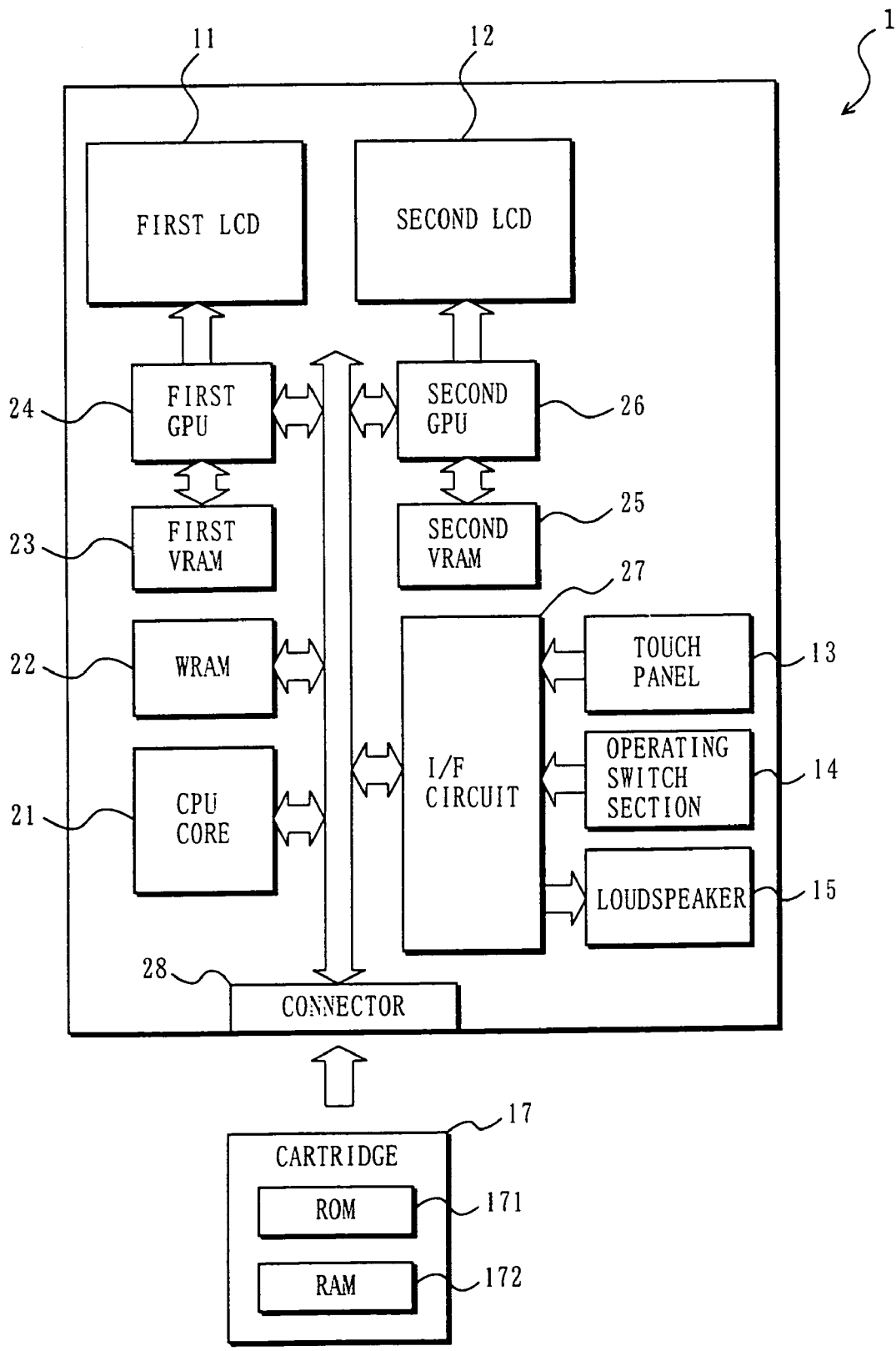
FIG. 2 is a block diagram showing an internal structure of a game apparatus 1.

An internal structure of the game apparatus 1 is described now with reference to FIG. 2. FIG. 2 is a block diagram showing the internal structure of the game apparatus 1.

In FIG. 2, the electronic circuit board accommodated in the housing 18a has a CPU core 21 mounted thereon. The CPU core 21 is connected through a predetermined path to a connector 28 for connection to the cartridge 17, and also connected to an input and output interface (I/F) circuit 27, a first graphics processing unit (GPU) 24, a second GPU 26, and a working RAM (WRAM) 22.

The cartridge 17 is detachably connected to the connector 28. As described above, the cartridge 17 is a storage medium having a game program stored therein, and specifically includes a ROM 171 in which the game program is stored and a RAM 172 for storing backup data in a rewritable manner. The game program stored in the ROM 171 of the cartridge 17 is loaded to the WRAM 22, and then implemented by the CPU core 21. The WRAM 22 stores temporary data obtained by the CPU core 21 implementing the game program or data for generating images.

The I/F circuit 27 is connected to the touch panel 13, the operating switch section 14, and the loudspeaker 15. The loudspeaker 15 is located behind a portion of the lower housing 18a where the sound holes 15b are formed.

The first GPU 24 is connected to a first video RAM (VRAM) 23, and the second GPU 26 is connected to a second VRAM 25. The first GPU 24, responsive to an instruction from the CPU core 21, generates a first game image based on data for generating an image stored in the WRAM 22, and renders the generated image on the first VRAM 23. The second GPU 26, responsive to an instruction from the CPU core 21, generates a second game image based on data for generating an image stored in the WRAM 22, and renders the generated image on the second VRAM 25.

The first VRAM 23 is connected to the first LCD 11, and the second VRAM 25 is connected to the second LCD 12. The first GPU 24 outputs the first game image rendered on the first VRAM 23 to the first LCD 11. The first LCD 11 displays the first game image outputted from the first GPU 24. The second GPU 26 outputs the second game image rendered on the second VRAM 25 to the second LCD 12. The second LCD 12 displays the second game image outputted from the second GPU 26.

Described next is a game process implemented by the game apparatus 1 in accordance with the game program stored in the cartridge 17. Note that in an exemplary illustrative embodiment, a game image is displayed only on the first LCD 11 having the touch panel 13 provided on its display screen. Accordingly, the game apparatus of such exemplary illustrative embodiments may be configured so as not to include the second LCD 12. The game apparatus of the exemplary illustrative embodiments herein can be realized by a game apparatus, a PDA, or the like, which includes at least one display device and implements a game program according to an exemplary illustrative embodiment.

Figure 3A:
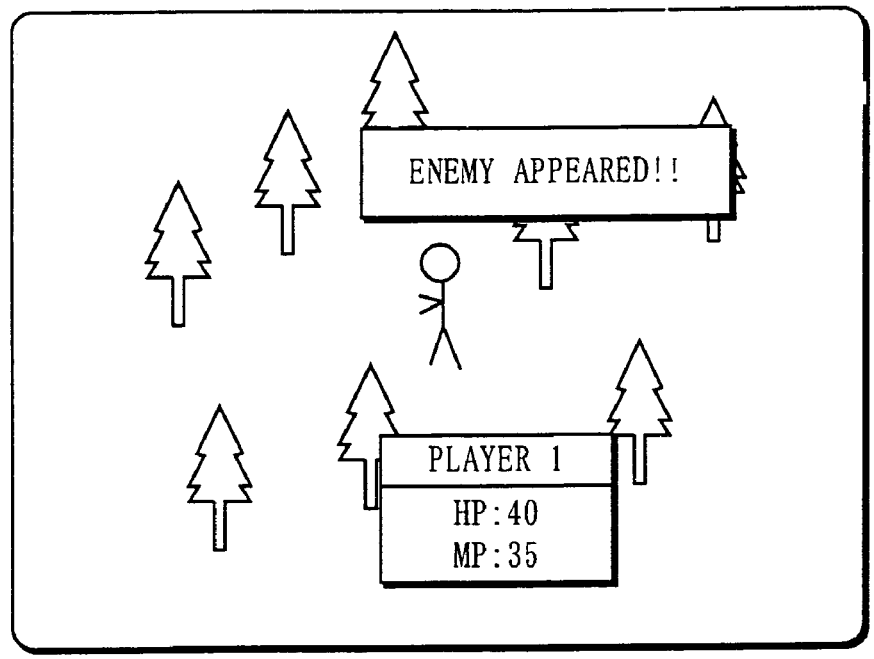
FIG. 3A is a diagram showing an exemplary game image displayed on a display screen of a first LCD 11.
Figure 3B:
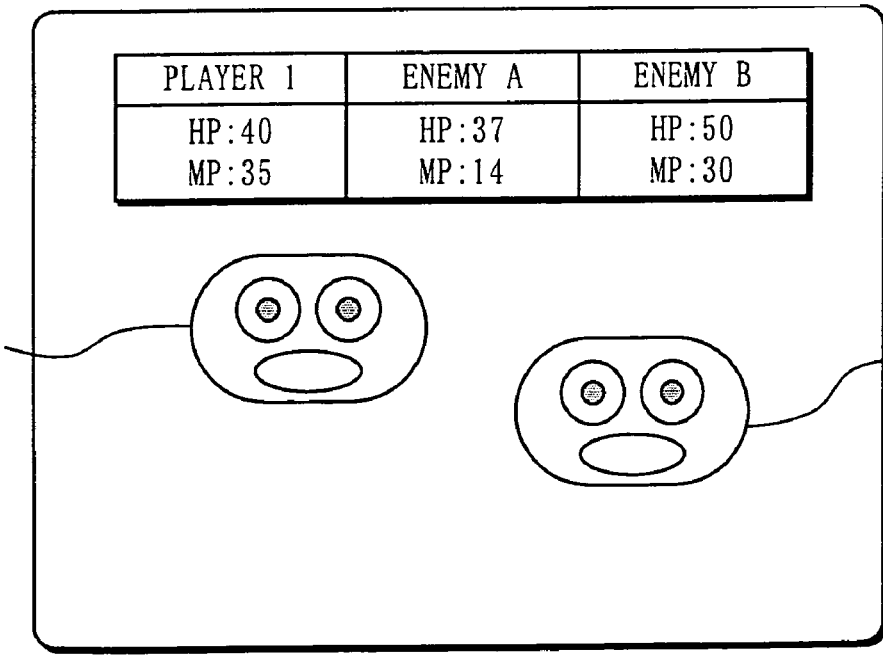
FIG. 3B is a diagram showing another exemplary game image displayed on the display screen of the first LCD 11.

The game process implemented by the game apparatus 1 is described first along with an outline of a game implemented by the game apparatus 1. FIGS. 3A and 3B each show an exemplary game image displayed on the display screen of the first LCD 11. The present exemplary illustrative embodiment is described by taking as an example a role-playing game as shown in FIG. 3A, though games of any type can be implemented by the game apparatus of the present invention. Scenes in the role playing game are generally classified into two types: a movement scene (FIG. 3A) in which a player character operated by the player moves on a game map, and a battle scene (FIG. 3B) in which the player character fights against enemy characters. In the movement scene, if a predetermined condition for the player character to encounter an enemy character is satisfied, the label "ENEMY APPEARED!!" is displayed as shown in FIG. 3A, and thereafter the game image is switched to the battle scene as shown in FIG. 3B. In the battle scene, the enemy character and characteristic parameters of the player character and the enemy character are displayed. In FIG. 3B, two enemy characters 31 and 32 are displayed. Note that each characteristic parameter indicates a value representing a characteristic of a game character appearing in the game. Specifically, the characteristic parameter is displayed on the first LCD 11 to indicate the player character's hit points (HP) or magic points (MP), or an enemy character's HP or MP. After the game image is switched to the battle scene, a battle progresses as the player character and the enemy characters attack each other.

Figure 4A:
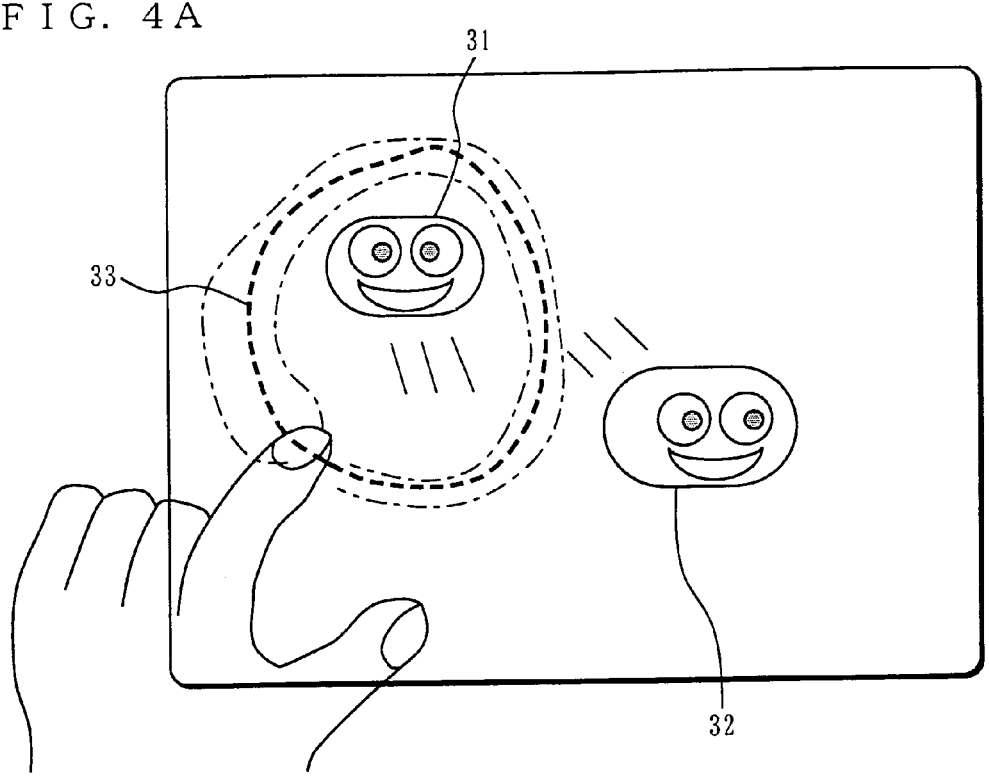
FIG. 4A is a diagram showing an exemplary game image displayed when a player is performing an attack operation.
Figure 4B:
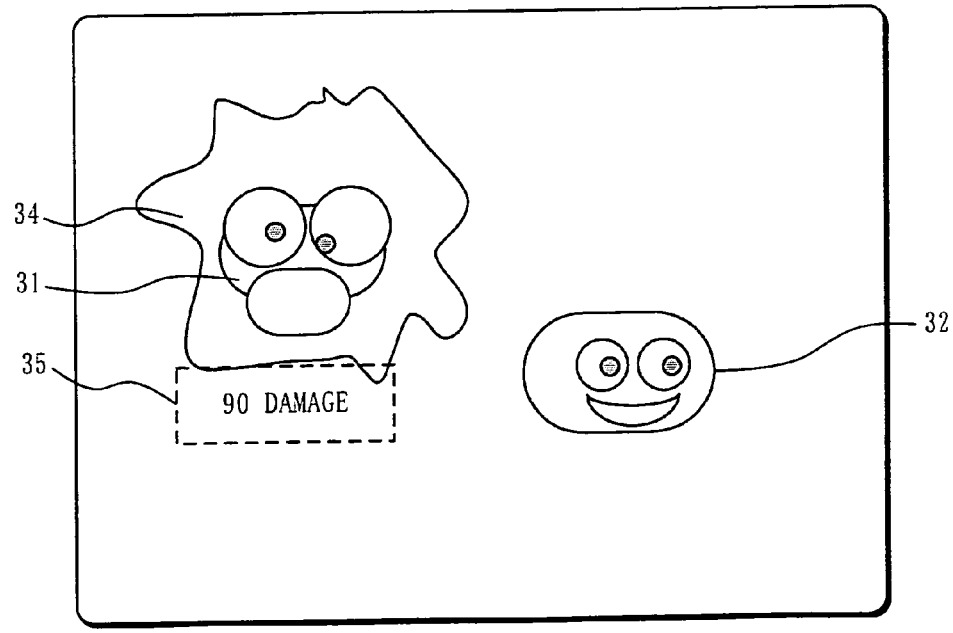
FIG. 4B is a diagram showing another exemplary game image displayed when the player is performing an attack operation.

FIGS. 4A and 4B each show an exemplary game image displayed when the player is performing an attack operation. When the player character's turn to attack comes during a battle, the player performs the attach operation using the touch panel 13. As shown in FIG. 4A, the player moves a finger (or the stick 16) on the touch panel 13. In this case, the player moves the finger so as to draw a predetermined trajectory (a reference graphic as described below). Such a trajectory indicates a position on the touch panel 13 where the player's input is provided, and is hereinafter referred to as an "input trajectory". For example, the shape of the input trajectory is predetermined to be circular, triangular, or rectangular. Accordingly, the player moves the finger on the touch panel 13 so as to draw, for example, a triangular or rectangular input trajectory. Note that in FIG. 4A, the one-dot chain lines indicate the movement of the player's finger.

The game image includes an input trajectory representation 33 representing the input trajectory (e.g., the broken line of FIG. 4A). The input trajectory is displayed at a position on the display which corresponds to a position on the touch panel 13 where the player's input is provided. That is, the input trajectory representation 33 is displayed as the player's finger moves on the touch panel 13. In FIG. 4A, the input trajectory is represented by a circle-like shape. The input trajectory representation 33 allows the player to clearly and directly perceive the input trajectory drawn by his/her input operation. Accordingly, the player is able to know whether the input trajectory is drawn in a desired shape.

The exemplary game image of FIG. 4B is displayed after the player's attack operation. In the present exemplary illustrative embodiment, the player character attacks an enemy character present in an area enclosed by the input trajectory. Accordingly, in FIG. 4B, an enemy character 31 is damaged by an attack of the player character. In the case where there is no enemy character in the area enclosed by the input trajectory, the player character is deemed to fail in the attack. If the player character is successful in the attack, an effect representation 34 is displayed for representing the player character's attack against the enemy character 31. Further, a damage indication 35 is displayed to indicate a degree of damage caused to the enemy character 31 by the player character's attack. At this point, the game apparatus 1 changes the characteristic parameter HP of the enemy character 31. In the example of FIG. 4B, the HP of the enemy character 31 is decreased by 90.

Note that in FIG. 4A, it is preferred that the enemy character 31 and an enemy character 32 move within a displayed area. This is because movements of the enemy characters 31 and 32 targeted for attack (e.g. targeted to be enclosed by the input trajectory) make it difficult to enclose the targeted enemy characters 31 and 32 by themselves with the input trajectory, thereby making the game more enjoyable.

Figure 5:
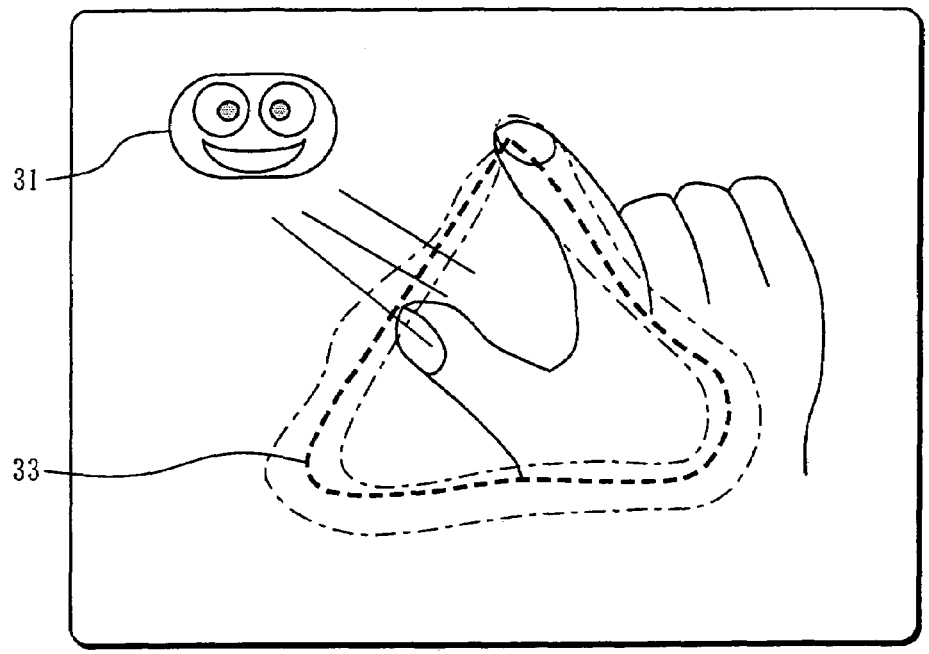
FIG. 5 is a diagram showing an exemplary game image where an input trajectory has a triangular shape.
Figure 6:
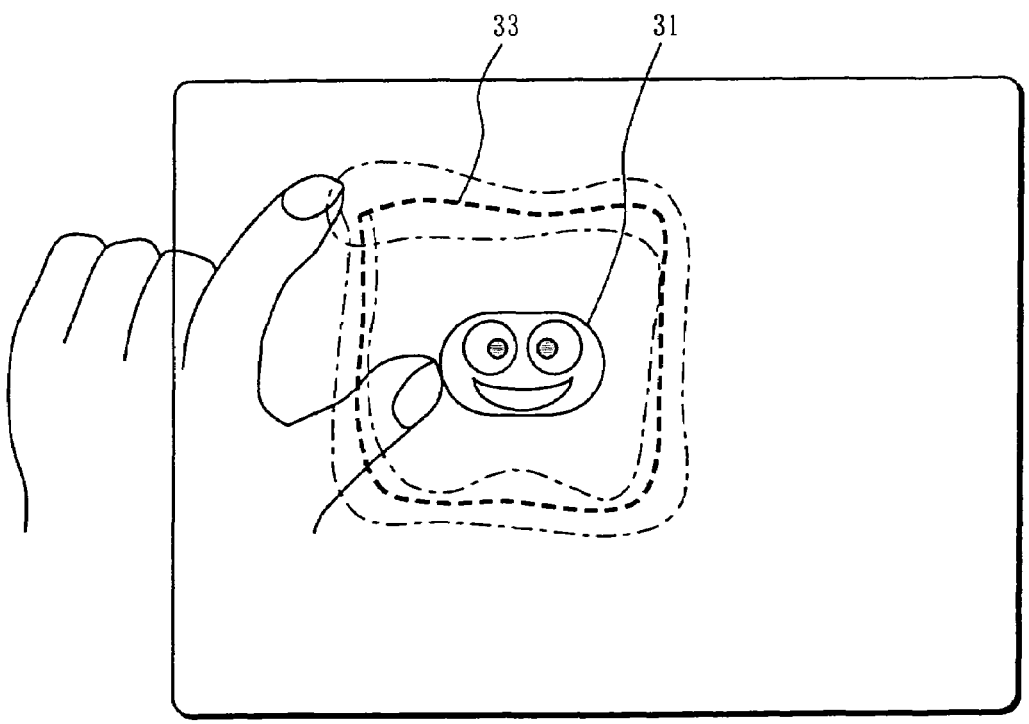
FIG. 6 is a diagram showing an exemplary game image where the input trajectory has a rectangular shape.

In the present exemplary illustrative embodiment, the style of attack by the player character is changed in accordance with the shape of the input trajectory. Examples of the style of attack by the player character include an attack by a sword and an attack by magic. Moreover, there are different types of attacks by magic, such as an attack by fire magic and an attack by water magic. FIG. 5 shows an exemplary game image where the input trajectory is triangular. In the present exemplary illustrative embodiment, when the player performs an input operation so as to draw a triangular input trajectory, the player character attempts an attack by wind magic. Note that in FIG. 5, the enemy character 31 is located outside the area enclosed by the triangular input trajectory, and therefore the player character fails in the attack. FIG. 6 shows an exemplary game image where the input trajectory is rectangular. In the present exemplary illustrative embodiment, when the player performs an input operation so as to draw a rectangular input trajectory, the player character attempts an attack by water magic. Note that when the player performs an input operation so as to draw a circular input trajectory (see FIG. 4A), the player character attempts an attack by fire magic. As described above, in the present exemplary illustrative embodiment, the style of attack is changed in accordance with the shape of the input trajectory. Accordingly, the player is able to provide diverse attacks by drawing input trajectories of various shapes on the touch panel 13.

Figure 7A:
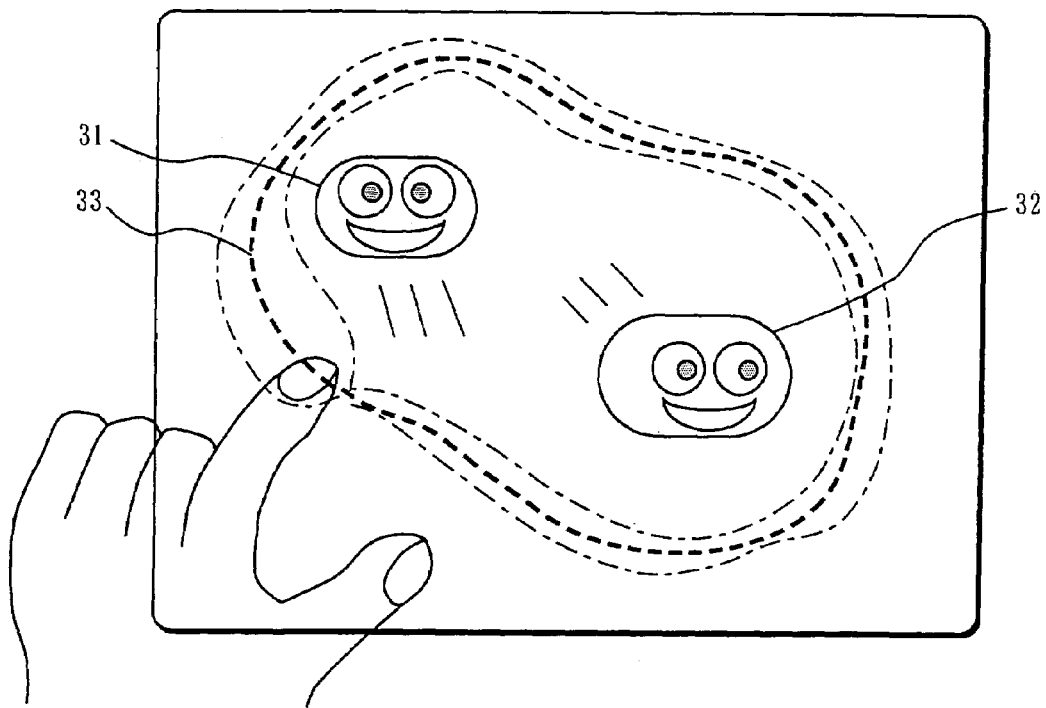
FIG. 7A is a diagram showing an exemplary game image where a plurality of enemy characters are attacked.
Figure 7B:
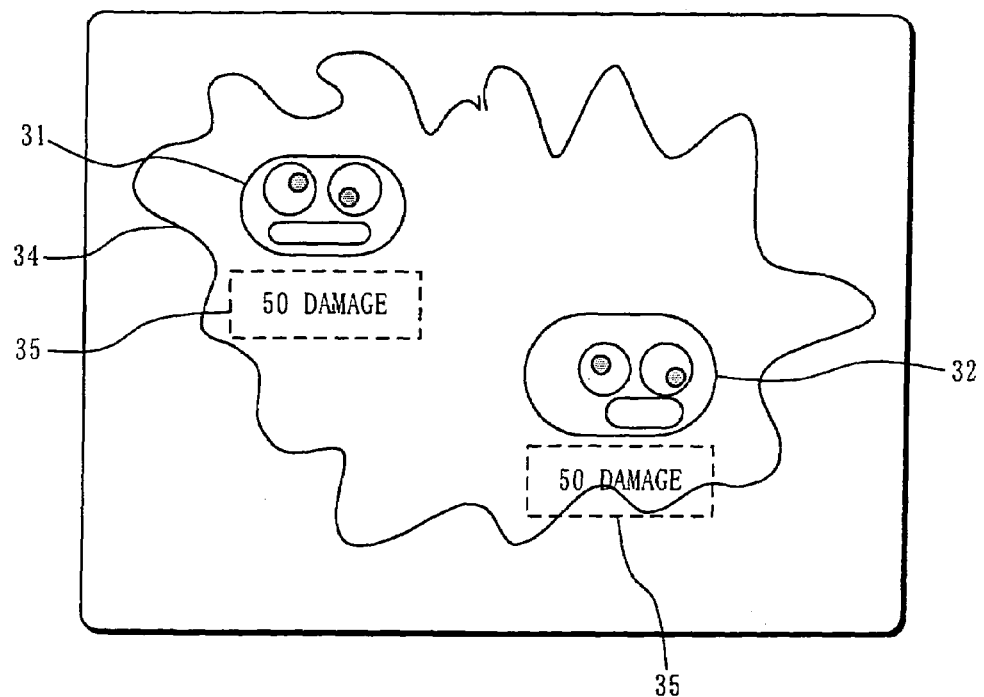
FIG. 7B is a diagram showing another exemplary game image where a plurality of enemy characters are attacked.

Further, in the present exemplary illustrative embodiment, a degree of damage to be caused to an enemy character varies in accordance with the size of the input trajectory. FIGS. 7A and 7B each show an exemplary game image in the case of attacking a plurality of enemy characters. Specifically, an exemplary game image displayed when the player is performing an attack operation is shown in FIG. 7A. In FIG. 7A, the input trajectory is larger in size than the input trajectory shown in FIG. 4A. Note that in FIG. 7A, two enemy characters 31 and 32 are enclosed by the input trajectory, and therefore targeted for attack by the player character. An exemplary game image displayed after the player's attack operation is shown in FIG. 7B. In FIG. 7B, a degree of damage caused to an enemy character is different from the degree of damage shown in FIG. 4B. Specifically, in FIG. 7B, the degree of damage caused to an enemy character is less than the degree of damage shown in FIG. 4B. In this manner, in the present exemplary illustrative embodiment, the degree of damage to be caused to an enemy character by an attack decreases as the size of the input trajectory increases.

Figure 8A:
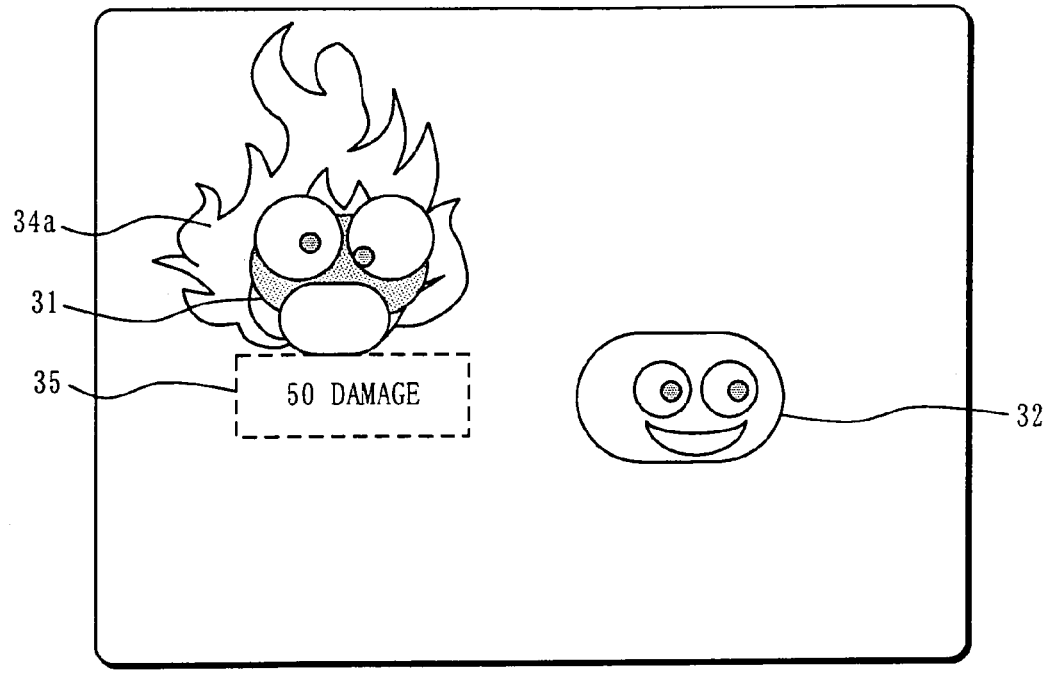
FIG. 8A is a diagram showing an exemplary game image displayed after the player's attack operation.
Figure 8B:
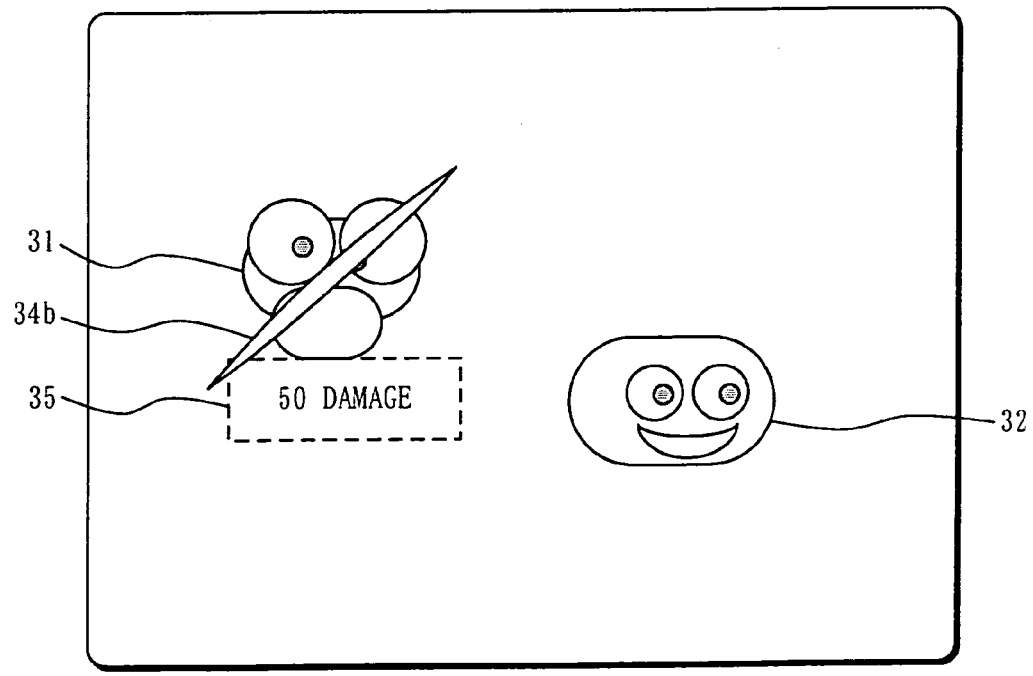
FIG. 8B is a diagram showing another exemplary game image displayed after the player's attack operation.

Furthermore, in the present exemplary illustrative embodiment, the type of the effect representation 34 varies in accordance with the style of the player character's attack. FIGS. 8A and 8B each show an exemplary game image displayed after the player's attack operation. Specifically, an exemplary game image of FIG. 8A is displayed after the player character's attack by fire magic. In FIG. 8A, an effect representation 34a, which represents that the enemy character 31 is attacked by fire, is displayed on the display screen of the first LCD 11. An exemplary game image of FIG. 8B is displayed after the player character's attack by a sword. In FIG. 8B, an effect representation 34b, which represents that the enemy character 31 is slashed with a sword, is displayed on the display screen of the first LCD 11. In this manner, the effect representation is changed in accordance with the style of attack, and therefore the player is able to visually perceive what kind of attack is attempted by his/her input operation. Accordingly, the player is able to visually confirm whether his/her input operation results in a desired attack.

Figure 9:
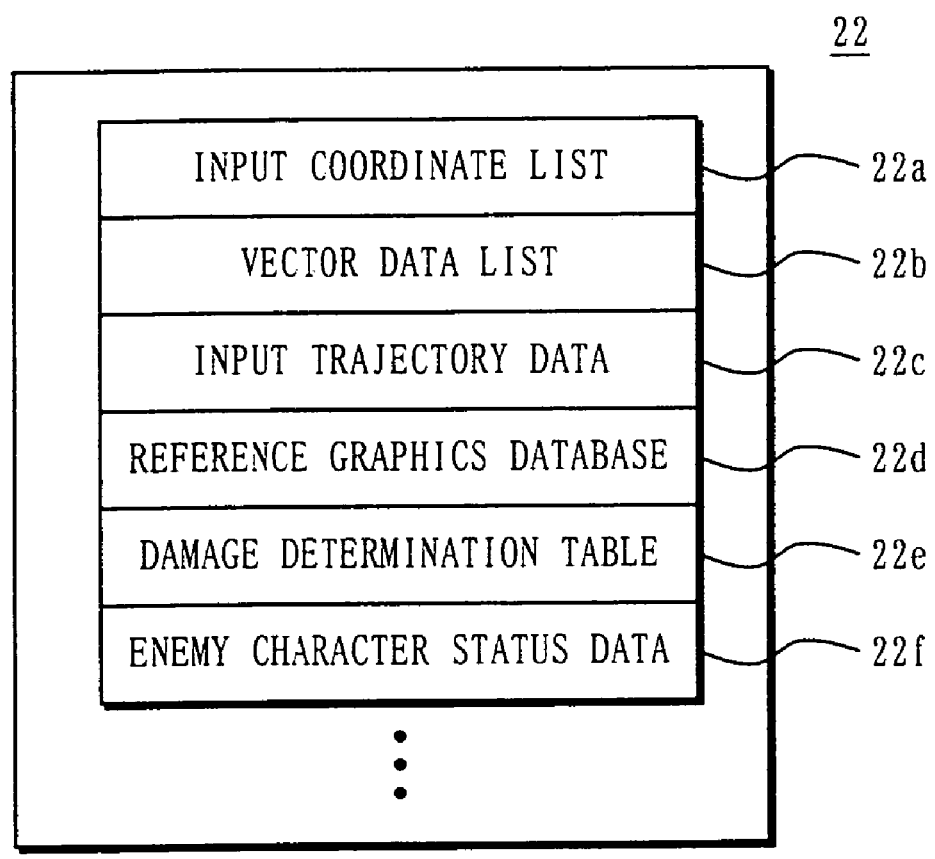
FIG. 9 is a diagram showing a memory map of a WRAM 22 included in the game apparatus 1.

Next, the details of the game process implemented by the game apparatus 1 are described. Described first is data that is stored into the WRAM 22 during the game process. FIG. 9 is a diagram showing a memory map of the WRAM 22 included in the game apparatus 1. For example, an input coordinate list 22a, a vector data list 22b, input trajectory data 22c, a reference graphics database 22d, a damage determination table 22e, and enemy character status data 22f are stored into the WRAM 22 during the game process. In addition to the above, a game program and game image data read from the cartridge 17 are stored in the WRAM 22.

The input coordinate list 22a comprises a set of coordinate values (a coordinate value group). Each coordinate value indicates a position on the touch panel where the player's input is provided. In the present exemplary illustrative embodiment, positions on the touch panel where the player's input is provided are detected at prescribed time intervals. While the player continuously provides inputs (for example, while the player's finger remains on the touch panel), coordinate values, which indicate detected positions, are stored as a list in the WRAM 22.

The vector data list 22b comprises a set of vector data (a vector data group). Each piece of vector data in the set indicates a direction and a distance between adjacent coordinate values comprising the input coordinate list 22a. The vector data list 22b is obtained based on the input coordinate list 22a.

The input trajectory data 22c represents, as a piece of vector data, a plurality of sequential pieces of vector data indicating the same direction and comprising the vector data list 22b. Accordingly, the input trajectory data 22c is obtained based on the vector data list 22b.

The reference graphics database 22d comprises a plurality of pieces of reference graphics data. Each piece of the reference graphics data represents a reference graphic designed so as to be associated with a style of attack by the player character, and the number of the plurality of pieces of the reference graphics data corresponds to the number of styles of attack by the player character. Note that the reference graphics database 22d is typically stored in the cartridge 17 together with the game program, and read from the cartridge 17 onto the WRAM 22 at the beginning of the game process. In the present exemplary illustrative embodiment, similar to the vector data list 22b and the input trajectory data 22c, the reference graphics data comprises a plurality of pieces of vector data. Note that the following descriptions of the game process are provided on the assumption that the reference graphics database 22d comprises reference graphics data representing a circle associated with an attack by fire magic, reference graphics data representing a triangle associated with an attack by wind magic, and reference graphics data representing a rectangle associated with an attack by water magic.

The damage determination table 22e is used for determining a degree of damage caused to an enemy character targeted for attack based on the style of an attack, the size of an input trajectory, and an attribute of the enemy character. Note that the size of the input trajectory corresponds to the size of a graphic drawn by the input trajectory, and the attribute of the enemy character is a parameter indicating a degree of resistance to the style of a specific attack. For example, the attribute of the enemy character indicates that the enemy character has high resistance to an attack by fire magic or low resistance to an attack by wind magic. Specifically, examples of the attribute include a water attribute, a fire attribute, etc. An enemy character having the water attribute has low resistance to an attack by fire magic but has high resistance to an attack by water magic. An enemy character having a fire attribute has low resistance to an attack by water magic but has high resistance to an attack by fire magic.

The enemy character status data 22f indicates the status of the enemy character. In the present exemplary illustrative embodiment, the enemy character status data 22f comprises characteristic parameters HP and MP of the enemy character, as well as data indicating attributes of the enemy character as described above. If the enemy character is attacked by the player character, the enemy character's HP stored in the WRAM 22 is reduced. If the enemy character's HP is reduced to zero, the enemy character is deemed to be eliminated. Note that in addition to the enemy character status data 22f, the WRAM 22 has stored therein data indicating the status of the player character. In addition to the data shown in FIG. 9, the WRAM 22 also has stored therein various types of data for use in the game process.

Figure 10:
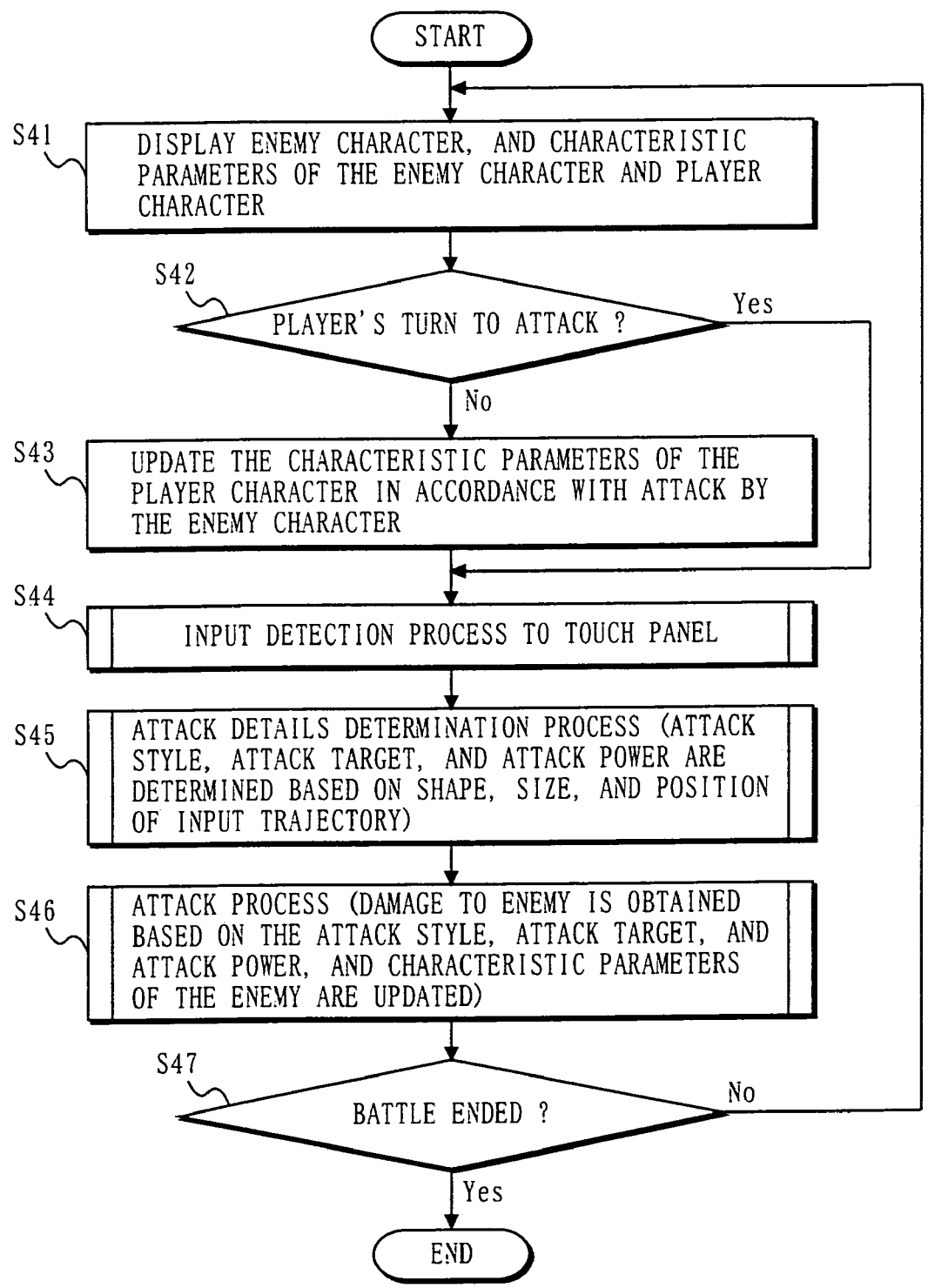
FIG. 10 is a flowchart showing a flow of a game process implemented by the game apparatus 1.

Next, a flow of the game process implemented by the game apparatus 1 is described with reference to FIGS. 10 through 20. FIG. 10 is a flowchart showing a flow of the game process implemented by the game apparatus 1. When the game apparatus 1 is turned on, the CPU core 21 of the game apparatus 1 implements a startup program stored in a boot ROM (not shown) to initialize units in the game apparatus 1, e.g., the WRAM 22. Then, a game program stored in the cartridge 17 is read onto the WRAM 22, and implementation of the game program is started. Consequently, a game image is generated in the first GPU 36, and then displayed on the first LCD 11, thereby starting a game. The game process shown in the flowchart of FIG. 10 is carried out after the game image is switched to a battle scene. Accordingly, the game process shown in the flowchart of FIG. 10 is started after a battle between the player character and the enemy characters is started. Note that the descriptions of the game process are omitted herein with respect to situations other than the battle scene which are not directly related to an exemplary illustrative embodiment.

Referring to FIG. 10, in step S41, an enemy character, the enemy character's characteristic parameters, and the player character's characteristic parameters are displayed on the display screen of the first LCD 11 (see FIG. 4B). In this case, the displayed characteristic parameters of the enemy character and the player character are HPs and MPs. In the following step S42, it is determined whether it is the player character's turn to attack. Note that a turn to attack is determined in accordance with a predetermined rule. Although this rule stipulates that the player character's turn to attack alternates with the enemy character's turn to attack, any rule can be adopted.

If it is determined in step S42 not to be the player character's turn to attack, the procedure proceeds to step S43 where the enemy character attacks the player character. Specifically, when the player character is attacked by the enemy character, values of characteristic parameters (i.e., HP and MP) of the player character are changed in accordance with the enemy character's attack. Accordingly, the values of the characteristic parameters of the player character stored in the WRAM 22 are updated. After the process of step S43, the procedure proceeds to step S44.

Referring back to step S42, if it is determined to be the player character's turn to attack, the player character attacks the enemy character in accordance with the processes of steps S44 through S46. In step S44, an input detection process to the touch panel 13 is performed. In the input detection process to the touch panel 13, it is determined whether any input has been provided to the touch panel 13, and the input coordinate list 22a is generated. The input detection process to the touch panel 13 is described below with reference to FIGS. 11-13.

Figure 11:
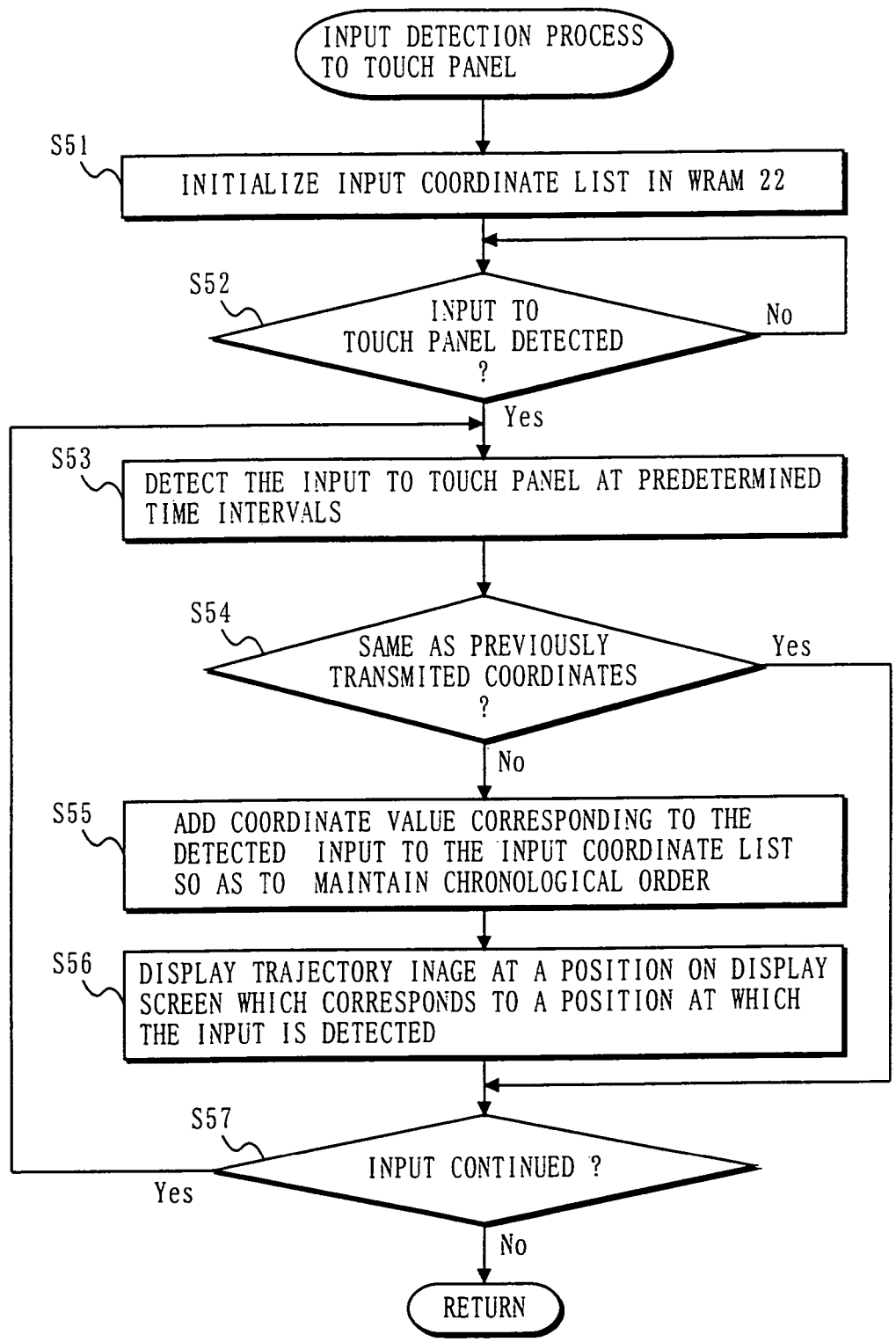
FIG. 11 is a flowchart showing a detailed flow of a process of step S44 shown in FIG. 10.

FIG. 11 is a flowchart showing a detailed flow of the process of step S44 shown in FIG. 10. Firstly, in step S51, the input coordinate list 22a stored in the WRAM 22 is initialized. Specifically, a memory region for storing a predetermined number of coordinate values is reserved within the WRAM 22. At this point, a coordinate value, which indicates a position where the player's input is provided, is not written in the input coordinate list 22a. In the following step S52, it is determined whether any input to the touch panel 13 has been detected. If the player has operated the touch panel 13 (e.g. the player has touched the touch panel 13), an input to the touch panel 13 is detected and the procedure proceeds to step S53. On the other hand, if the player has not operated the touch panel 13, no input to the touch panel 13 is detected and the procedure returns to step S52. That is, the process of step S52 is repeatedly performed until the player operates the touch panel 13.

Processes of steps S53 through S57 are performed for detecting an input position on the touch panel 13. Through the processes of steps S53 through S57, the input coordinate list 22a is generated. The outline of the processes of steps S53 through S57 is described below with reference to FIGS. 12 and 13.

Figures 12, 13:
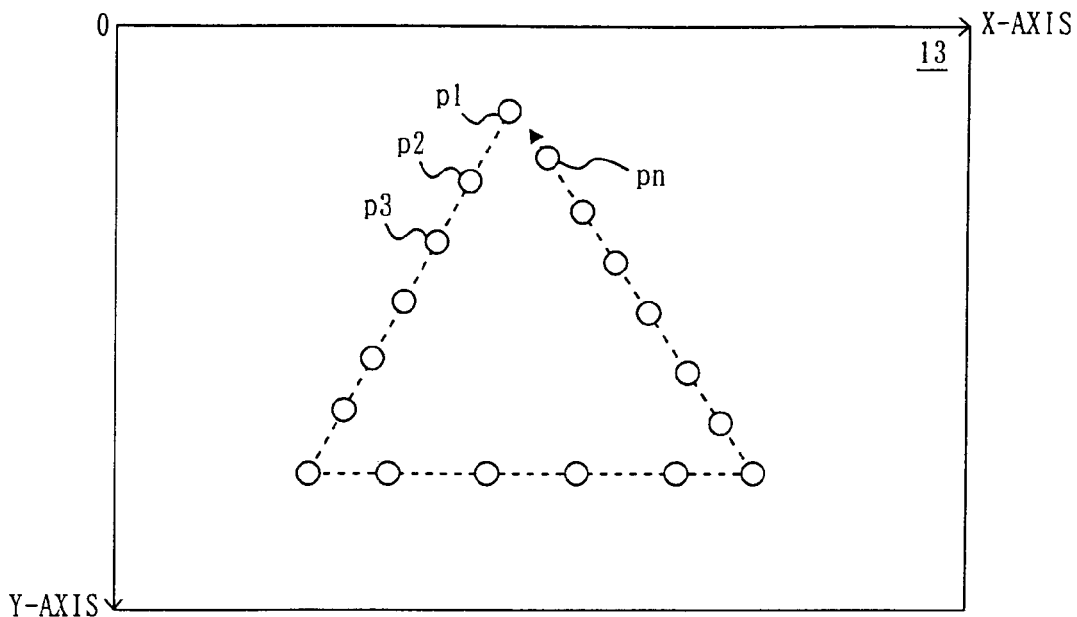

FIG. 12 is a diagram schematically showing how an input to a touch panel is performed. In FIG. 12, the player is assumed to have performed an input operation so as to draw an input trajectory, as indicated by broken lines. In response to the input operation, the game apparatus 1 detects a position on the touch panel where the player's input is provided, at prescribed time intervals. Circles shown in FIG. 12 indicate locations (detection points) at which the player's input to the touch panel 13 has been detected.

In FIG. 12, a detection point p1 is detected before subsequent detection points p2, p3, . . . are sequentially detected. Note that in FIG. 12, the y-axis indicates the vertical axis (a normal direction thereof is directed downward to the bottom of FIG. 12), the x-axis indicates the horizontal axis (a normal direction thereof is directed to the right of FIG. 12), and the top left corner of the touch panel 13 is at the origin. There are n detection points (where n is an arbitrary integer). A coordinate value of the detection point p1 is (80, 40), a coordinate value of the detection point p2 is (77, 42), and a coordinate value of the detection point p3 is (75, 45).

FIG. 13 shows an exemplary input coordinate list 22a generated when the player's input is provided as shown in FIG. 12. As shown in FIG. 13, the input coordinate list 22a comprises detected coordinate values in the order of detection. Specifically, the coordinate value (80, 40) at the detection point p1 is listed first, the coordinate value (77, 42) at the detection point p2 is listed second, and the coordinate value (75, 45) at the detection point p3 is listed third. In this manner, the coordinate values at the detection points are written into the input coordinate list 22a. Note that the exemplary input coordinate list shown in FIG. 13 comprises n coordinate values corresponding to the number of detection points.

Referring back to FIG. 12, the player's input to the touch panel 13 is not detected after detection of an n'th detection point pn. Consequently, the input coordinate list 22a having n coordinate values included therein is generated. The thus-generated input coordinate list 22a represents an input trajectory drawn by a continuous input to the touch panel 13. The detailed descriptions of the processes of steps S53-S57 are given below.

Referring back to FIG. 11, in step S53, the player's input to the touch panel 13 is detected at prescribed time intervals. Specifically, coordinate values, which indicate positions on the touch panel 13 where the player's input is provided, are sequentially transmitted from the touch panel 13 to the CPU core 21. In the following step S54, it is determined whether the latest coordinate value detected in step S53 is the same as a previous coordinate value. If these two values are determined to be the same, the processes of steps S55 and S56 are skipped because they are not required to be performed, and the procedure proceeds to step S57.

Referring back to step S54, if it is determined that the latest coordinate value detected in step S53 is not the same as the previously coordinate value, the procedure proceeds to step S55 where the latest coordinate value is added to the input coordinate list 22a so as to maintain chronological order. That is, the latest coordinate value detected in step S53 is stored into the input coordinate list 22a so as to follow the previous coordinate value as in the order they are detected.

Following step S55, in step S56, the input trajectory representation 33 (FIG. 4A) is displayed at a position on the display screen which corresponds to a position represented by coordinate values detected in step S53. Specifically, a line extending between a location indicated by the latest coordinate value detected in step S53 and the previous coordinate value is displayed on the first LCD 11. After the process of step S56, the procedure proceeds to step S57.

In step S57, it is determined whether the player's input to the touch panel 13 is continued, (e.g. whether the player's finger remains on the touchpanel 13). In step S57, if the player's finger remains on the touch panel 13, the input to the touch panel 13 is detected, and therefore it is determined that the player's input to the touch panel 13 is continued. In this case, the procedure returns to step S53. Accordingly, while the player's input to the touch panel 13 is continued, the processes of steps S53 through S57 are repeatedly performed.

Note that in step S57, if the player's finger is out of contact with the touch panel 13, no input to the touch panel 13 is detected. Accordingly, it is determined that the player's input to the touch panel 13 is not continued. In this case, the CPU core 21 terminates the input detection process to the touch panel shown in FIG. 11.

Referring back to FIG. 10, following step S44, an attack details determination process is performed in step S45. In the attack details determination process, the style of an attack, an attack target, and an attack power are determined based on the shape, size, and position of the input trajectory. The detailed descriptions of the attack details determination process are provided below with reference to FIGS. 14 through 18.

Figure 14:
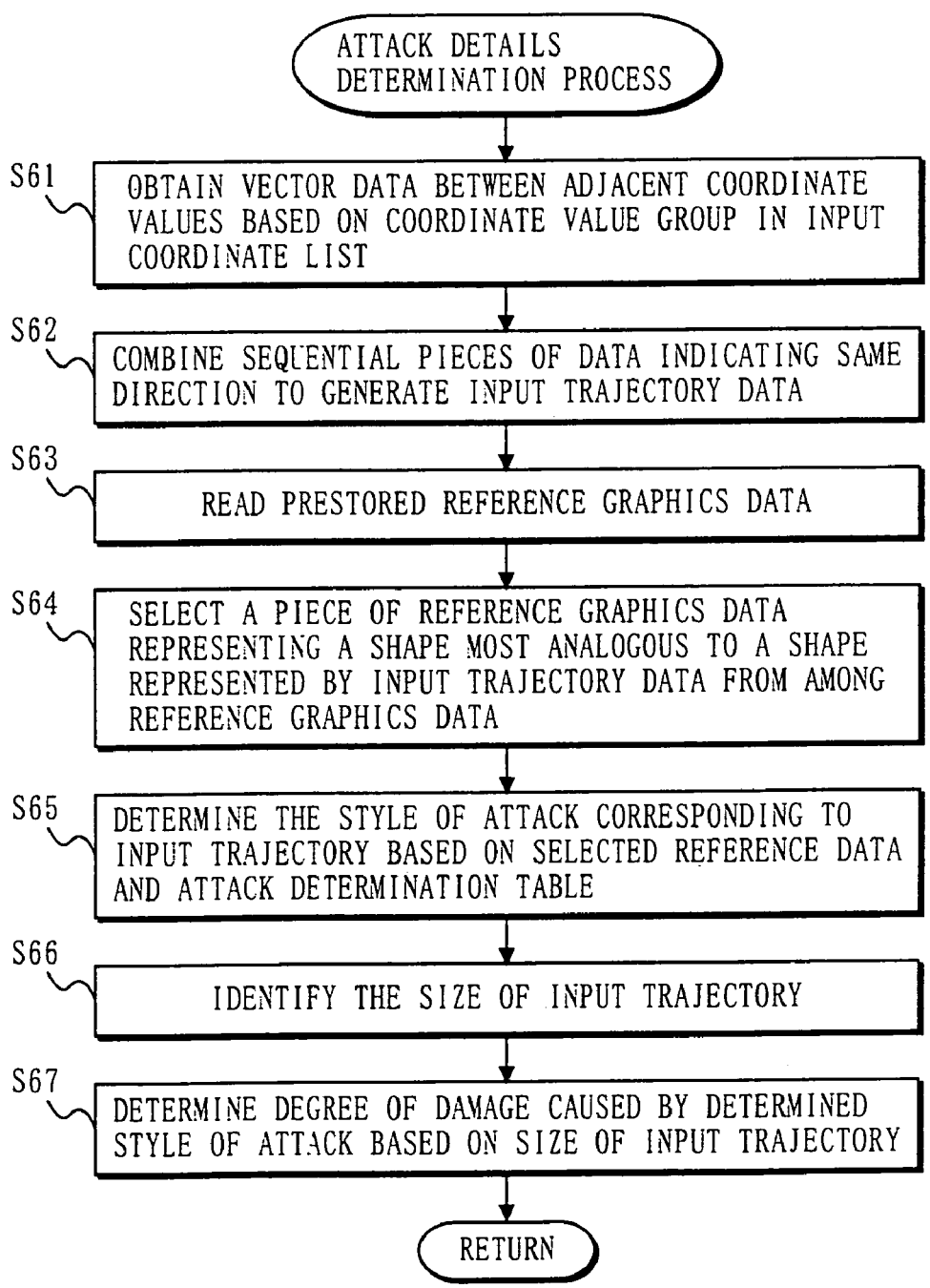
FIG. 14 is a flowchart showing a detailed flow of a process of step S45 shown in FIG. 10.

FIG. 14 is a flowchart showing the details of a flow of the process of step S45 shown in FIG. 10. In FIG. 14, the processes of steps S61 and S62 are performed for simplifying information comprising the input coordinate list 22a generated in step S44. Since the information comprising the input coordinate list 22a is a set of coordinate values, if the information is not suitably processed, it is difficult to identify the shape of the input trajectory. The processes of steps S61 and S62 are intended to facilitate easy identification of the shape of the input trajectory by processing the information comprising the input coordinate list 22a. The outline of the processes of steps S61 and S62 is now described.

Figure 15A:
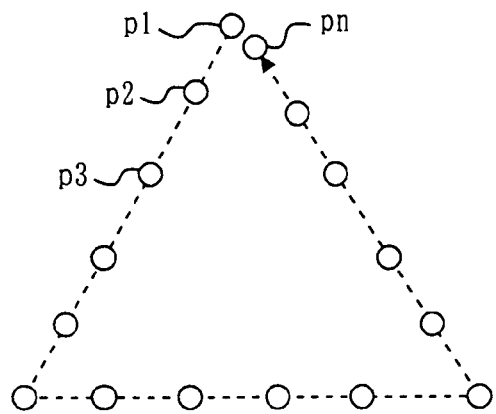
Figure 15B:
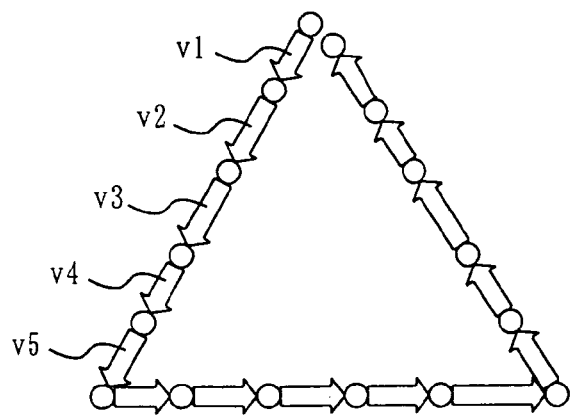
Figure 15C:
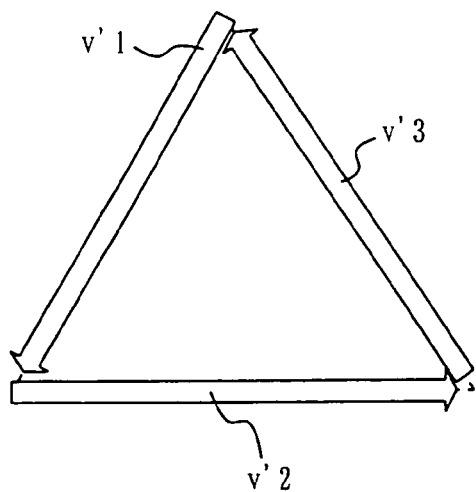

FIGS. 15A through 15C are diagrams used for explaining a process for simplifying the input coordinate list 22a. FIG. 15A is a diagram schematically showing a coordinate value group comprising the input coordinate list 22a. As described above, the input coordinate list 22a comprises coordinate values indicating positions on the touch panel 13 which are detected at predetermined time intervals. In FIG. 15A, detection points p1, p2, and p3 each correspond to a coordinate value comprising the input coordinate list 22a. In the processes of steps S61 and S62, the vector data list 22b is initially generated based on the input coordinate list 22a.

FIG. 15B is a diagram schematically showing the vector data list 22b. The vector data list 22b comprises a plurality of pieces of vector data each indicating a vector between adjacent detection points. For example, a vector v1 shown in FIG. 15B lies between the detection points p1 and p2. Note that each vector is obtained so as to point in a direction of the player's input operation, (e.g. the vector is directed from a previously detected point to a later detected point). The vector data list 22b is generated by obtaining all of the plurality of pieces of vector data between adjacent detection points (see step S61 which will be described later). Note that eight directions are represented by the plurality of pieces of vector data comprising the vector data list 22b. For example, although there might be a slight difference between a direction from the detection point p1 to the detection point p2 and a direction from the detection point p2 to the detection point p3, the vectors v1 and v2 are treated as the same direction because information related to directions are simplified when generating the vector data.

Next, in the processes of steps S61 and S62, the input trajectory data 22c is generated based on the vector data list 22b. Specifically, sequential pieces of vector data indicating the same direction and comprising the vector data list 22b are combined into one piece of vector data. FIG. 15C is a diagram schematically showing the input trajectory data 22c. Since vectors v1 through v5 shown in FIG. 15B have the same direction as each other, they are combined into one piece of vector data. As a result, in FIG. 15C, one side of a triangular input trajectory is represented by one vector v'1. Similarly, in other sides of the triangular trajectory, vectors with the same direction are combined into one vector. As a result, the input trajectory data 22*c* represents an input trajectory with three pieces of vector data. Accordingly, based on the input trajectory data 22*c* including the three pieces of vector data, it can be readily recognized that the input trajectory shown in FIGS. 15A through 15C have a triangular shape. In this manner, through the processes of steps S61 and S62, it is possible to considerably simplify information representing the input trajectory, thereby making it possible to facilitate identification of the shape of the input trajectory.

Figure 16A:
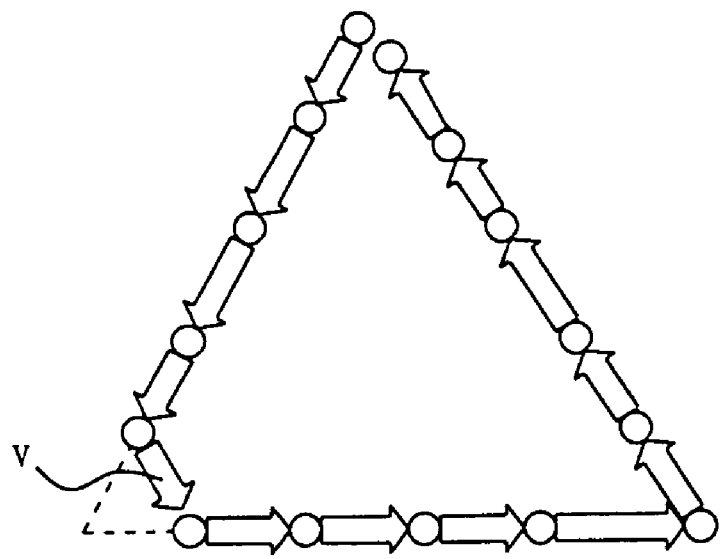
Figure 16B:
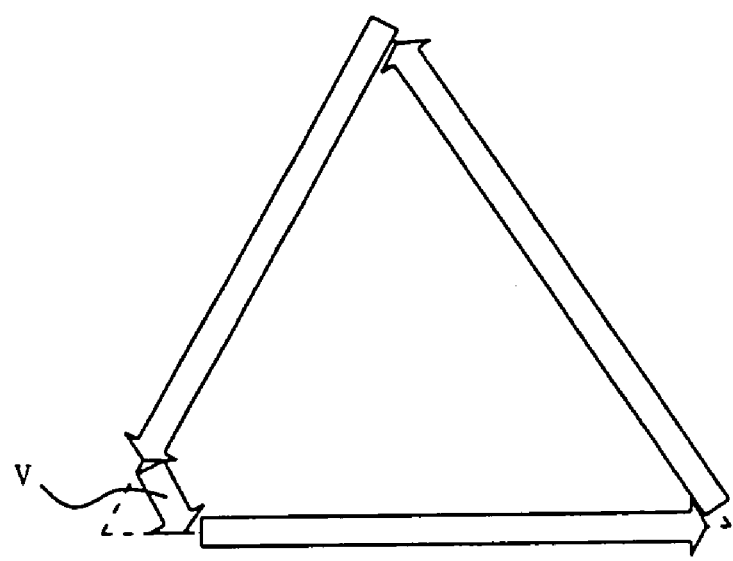

Note that if the time intervals of detecting an input to the touch panel 13 are relatively long, or if the speed at which the player moves his/her finger on the touch panel 13 is relatively fast, there is a possibility that a position of a vertex of the input trajectory might not be detected. In such a case, as shown in FIG. 16A, vector data v, which is inconsistent with an actual input trajectory (indicated by dotted lines), is obtained. Consequently, the input trajectory data 22*c* comprises four pieces of vector data (see FIG. 16B), and therefore the input trajectory might be misrecognized as a rectangle, for example. In order to prevent this, in addition to the processes of steps S61 and S62, a correction process may be performed for deleting vector data of less than a prescribed length from the vector data stored in the input trajectory data 22*c*. This deletes a piece of vector data, which is generated when a position of a vertex of the input trajectory is not detected and is inconsistent with an actual input trajectory, thereby preventing misrecognition of the shape of the input trajectory.

Referring back to FIG. 14, the detailed descriptions of the processes of steps S61 and S62 are provided below. In step S61, a piece of vector data indicating a vector between adjacent coordinate values is obtained based on the coordinate value group comprising the input coordinate list 22*a* (see FIG. 15B). The vector data list 22*b* is generated by obtaining each piece of vector data between adjacent detection points. Note that a piece of vector data between an i'th input coordinate value (where i is a natural number equal to or less than n−1) and an i+1'th input coordinate value is listed i'th in the vector data list 22*b*.

Figures 17A, 17B:
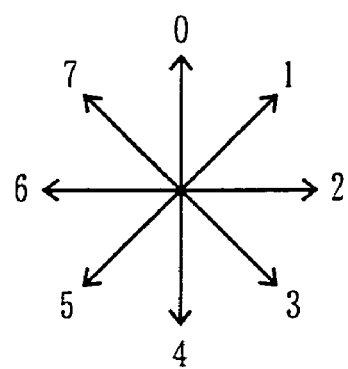
FIG. 17A is a diagram used for explaining a vector data list 22b.
FIG. 17B is another diagram used for explaining the vector data list 22b.

FIGS. 17A and 17B are diagrams used for explaining the vector data list 22*b*. Specifically, FIG. 17A shows an exemplary vector data list 22*b* obtained by performing the process of step S45. As described above, in the present exemplary illustrative embodiment, directions of vectors are represented with eight directions. Specifically, the directions of the vectors are represented using direction codes 0 through 7 shown in FIG. 17B. The direction of a vector can be obtained based on coordinate values of adjacent detection points as described below. Consider a case where a coordinate value of a previously obtained detection point is represented by (x1, y1), a coordinate value of a later obtained detection point is represented by (x2, y2), Rx=x2−x1, and Ry=y2−y1. If Ry<0 and |Ry|>2|Rx|, the direction code is 0 (an upward direction); if Rx>0, Ry<0, and 2|Rx|>=|Ry|>=|Rx|/2, the direction code is 1 (an upper right direction); if Rx>0 and |Rx|>2|Ry|, the direction code is 2 (a right direction); if Rx>0, Ry>0, and 2|Rx|>=|Ry|>=|Rx|/2, the direction code is 3 (a lower right direction); if Ry>0 and |Ry|>2|Rx|, the direction code is 4 (a downward direction); if Rx<0, Ry>0, and 2Rx|>=|Ry|>=|Rx|/2, the direction code is 5 (a lower left direction); if Rx<0 and |Rx|>2|Ry|, the direction code is 6 (a left direction); if Rx<0, Ry<0, and 2|Rx|>=|Ry|>=|Rx|/2, the direction code is 7 (an upper left direction). In this manner, the vector data can be represented with the above eight directions. This simplifies the shape of the input trajectory, and therefore it is possible to simplify a process for identifying the shape of the input trajectory (which will be described later in relation to step S64). Note that the top left corner of the display screen is at the origin, and a coordinate value increases as a distance from the origin increases on a side of the display screen.

Referring back to FIG. 14, following step S61, the process of step S62 is performed. In step S62, the input trajectory data 22*c* is generated based on the vector data list 22*b*. Specifically, the input trajectory data 22*c* is generated by combining sequential pieces of vector data indicating the same direction and comprising the vector data list 22*b*. The sequential pieces of vector data indicating the same direction are shown in FIG. 17A as, for example, four pieces of vector data respectively specified by data nos. 1 through 4. These four pieces of vector data have the same direction code, and therefore can be combined into one piece of vector data. The distance of the combined vector data is equal to the sum of the distances of the four pieces of vector data. The direction of the combined vector data is naturally the same as the direction of the four pieces of vector data. As for vector data specified by data nos. 5 and greater, pieces of vector data indicating the same direction are similarly combined into one piece of vector data. Thus, the input trajectory data 22*c* as shown in FIG. 18 is obtained. In FIG. 18, vector data specified by data no. 1 (distance: 10; direction: 5) is obtained by combining the pieces of vector data specified by data nos. 1 through 4 comprising the vector data list 22*b* shown in FIG. 17A.

Following step S62, in step S63, the reference graphics database 22*d* is read from the WRAM 22. FIG. 19 is a diagram showing an exemplary reference graphics database 22*d*. As shown in FIG. 19, in the reference graphics database 22*d*, shapes of reference graphics and reference graphics data representing the shapes are associated with each other. Similar to the vector data list 22*b* and the input trajectory data 22*c*, a piece of the reference graphics data representing the shapes of the reference graphics comprises vector data. In FIG. 19, the reference graphics data are associated with a rectangle, a circle, and a triangle, for example. In the present exemplary illustrative embodiment, eight directions can be represented by the vector data, and therefore the reference graphics data associated with the circle actually represents an octagon. Moreover, all sides of a reference graphic have a length of 1.

In step S64, a piece of reference graphics data, which represents a shape most analogous to a shape represented by the input trajectory data generated in step S62, is selected from the reference graphics data read in step S63. The shape represented by the reference graphics data selected in step S64 is identified as the shape of the input trajectory. The details of the process of step S64 are as follows.

In step S64, similarity transformation is performed on the input trajectory data. In the similarity transformation, a graphic represented by the input trajectory data is enlarged or reduced so as to be almost equal in size to the reference graphic. In the present exemplary illustrative embodiment, a magnification for enlargement or reduction is determined based on a piece of vector data indicating a minimum distance (hereinafter, referred to as "vector data A") and a piece of vector data indicating a maximum distance (hereinafter, referred to as "vector data B"). Specifically, the magnification for enlargement or reduction is determined by the following exemplary formula: (the magnification for enlargement or reduction)=(a distance indicated by the vector data A)/(a distance indicated by the vector data B). For example, consider a case where the similarity transformation is performed on the input trajectory data shown in FIG. 18 for comparison with the reference graphics data shown in FIG. 19. In this case, a minimum distance of vector data comprising the reference graphic data is 1, and a minimum distance of vector data comprising the input trajectory data is 10. Accordingly, the obtained magnification for enlargement or reduction is ⅒.

Therefore, the vector data comprising the input trajectory data is reduced to 1/10 in order to obtain a graphic represented by the input trajectory data which is almost equal in size to the reference graphic.

After the similarity transformation is performed on the input trajectory data, the input trajectory data is compared with the reference graphics data. For example, the comparison is performed using a dissimilarity value. The dissimilarity value indicates a degree of difference between the shape represented by the input trajectory data subjected to the similarity transformation and the shape represented by the reference graphics data. For example, the dissimilarity value is obtained by the following expression:

(the dissimilarity value)=(a difference in number of pieces of vector data)×10+(the number of different directions)×2+(sum of differences between distances)×1

In the above expression, the difference in number of pieces of vector data corresponds to a difference between the number of pieces of vector data comprising the input trajectory data and the number of pieces of vector data comprising the reference graphics data. For example, the number of pieces of vector data comprising the input trajectory data shown in FIG. 18 is 3, and the number of pieces of vector data comprising the reference graphics data A (rectangle) shown in FIG. 19 is 4. Accordingly, in this case, the difference in number of pieces of vector data is 1.

The number of different directions corresponds to the number of differences between directions indicated by the vector data comprising the input trajectory data and directions indicated by the vector data comprising the reference graphics data. For example, comparing the input trajectory data shown in FIG. 18 and the reference graphics data A (rectangle) shown in FIG. 19, it is found that only vector data indicating a vector directed to the right (i.e., a piece of vector data specified by data no. 2 in FIG. 18 and a piece of vector data specified by data no. 2 in the reference graphics data A (rectangle) in FIG. 19) are equal in direction to each other. No vector data comprising the reference graphics data A shown in FIG. 19 indicates the same direction as the directions indicated by two other pieces of vector data comprising the input trajectory data, and therefore the difference in number of directions is 2.

The sum of differences between distances corresponds to a sum of differences in distance between vector data comprising the input trajectory data and vector data comprising the reference graphics data. Specifically, a difference between two pieces of vector data specified by the same data number are obtained with respect to the vector data comprising the input trajectory data 22c and the reference graphics data. Further, the sum of differences obtained with respect to all data numbers is calculated. For example, in the case of comparing the input trajectory data (subjected to the similarity transformation) shown in FIG. 18 to the reference graphics data A (rectangle) shown in FIG. 19, distances indicated by the vector data are all 1, and therefore the sum of differences of distances is 0.

In step S64, each piece of the reference graphics data is compared to the input trajectory data. Consequently, a piece of the reference graphics data having a minimum dissimilarity value is selected as representing a shape, which is most analogous to the shape represented by the input trajectory data. Note that when the input trajectory data shown in FIG. 18 is compared to the reference graphics data A through C shown in FIG. 19, the reference graphics data C (triangle) has a dissimilarity value of 0, and therefore the reference graphics data C (triangle) is selected as representing a shape which is most analogous to the shape represented by the input trajectory data. Thus, the shape of the input trajectory is identified to be a triangle.

Following step S64, in step S65, the style of attack corresponding to the shape of the input trajectory is determined based on the selected piece of reference graphics data and the attack determination table. FIG. 20 shows an exemplary attack determination table. As shown in FIG. 20, in the attack determination table, shapes of input trajectories are associated with styles of attack. In step S65, the style of attack corresponding to the shape of the input trajectory is determined so as to correspond to the shape of the input trajectory specified in step S64.

Following step S65, in step S66, the size of the input trajectory is identified. Note that the size of the input trajectory is represented relative to the size of the reference graphic. Specifically, the size of the input trajectory is expressed by a magnification relative to the reference graphic. For example, an input trajectory represented by the input trajectory data shown in FIG. 18 is ten times larger than the reference graphic represented by the reference graphics data C (triangle) shown in FIG. 19. The magnification used for expressing the size of the input trajectory can be obtained as a reciprocal of a magnification used in the above-described similarity transformation (step S64).

Following step S66, in step S67, an attack power is determined based on the size of the input trajectory identified in step S66. The attack power is represented by a numerical value associated with a degree of damage to be caused to an enemy character. Final damage to be caused to the enemy character is determined by adjusting the attack power in step S75 which will be described later. Specifically, a value of the attack power is determined with reference to the attack determination table shown in FIG. 20. In the attack determination table of FIG. 20, basic damage and a magnification corresponding to the size of the input trajectory are associated for each style of attack. The product of the basic damage and the magnification corresponds to the value of the attack power. For example, when the style of attack is an attack by fire magic and the size of the input trajectory is three times the input trajectory, the value of the attack power is obtained such as 30 (basic damage)×0.5=15. After the process of step S67, the procedure of the flowchart shown in FIG. 14 is terminated.

Referring back to FIG. 10, following step S45, an attack process of step S46 is performed. The attack process is performed to cause damage to the enemy character based on, for example, the attack power determined in step S45. The details of the attack process are described below with reference to FIGS. 20 through 22.

Figure 21:
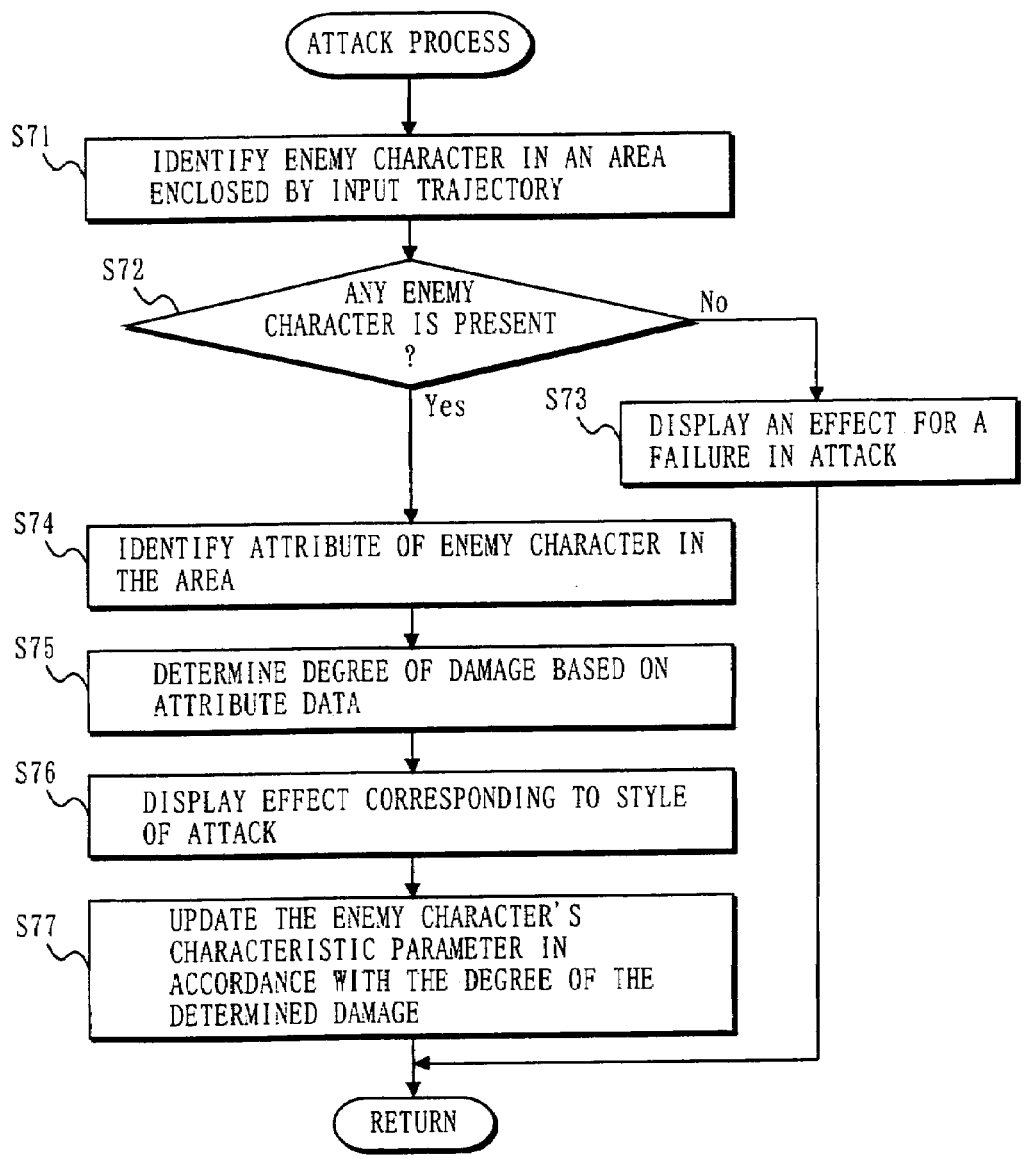
FIG. 21 is a flow chart showing a detailed flow of a process of step S46 shown in FIG. 10.

FIG. 21 is a flowchart showing the details of a flow of the process of step S46 shown in FIG. 10. In step S71, of enemy characters displayed in a game image, an enemy character in an area enclosed by the input trajectory is identified. The identified enemy character is targeted for attack by the player character. Note that an enemy character partially lying in the area may or may not be targeted for attack. In the following step S72, it is determined whether any enemy character has been identified in step S71. If no enemy character has been identified in step S71 (e.g. the enemy character is not present in the area), the procedure proceeds to step S73. In this case, there is no enemy character targeted for attack, in the area, an effect representation is presented to show the failure of the attack, and the process shown in FIG. 21 is terminated.

Alternatively, if it is determined in step S72 that there has been an enemy character identified in step S71, the processes of steps S74 through S77 are performed. In the processes of steps S74 through S77, a degree of damage to be caused to the enemy character targeted for attack is determined. Firstly, in step S74, an attribute of the enemy character identified in step S71 is identified. The process of step S74 is performed based on the enemy character status data $22f$. FIG. 22 is a diagram showing an example of the enemy character status data. As shown in FIG. 22, the enemy character status data $22f$ comprises attribute data, HP, and MP for each enemy character. In step S74, the attribute data of the enemy character identified at step S71 is identified as attributed character attribute data specified in step S71.

Following step S74, in step S75, damage to be caused to the enemy character is determined based on the attribute data identified in step S74. Specifically, in step S75, the damage is determined based on the attack power determined in step S44 and the attribute data read in step S74. Note that the above determination process is provided with reference to the attack determination table shown in FIG. 20. As shown in FIG. 20, in the attack determination table, a magnification from basic damage is set for each set of a style of attack and enemy character attributes. In the process of step S75, a magnification corresponding to the enemy character's attribute is determined based on the attribute identified in step S74 and the style of attack determined in step S65. In the example of FIG. 20, if the style of attack is an attack by water magic and the attribute of the enemy character is a fire attribute, the magnification is determined to be twice the degree of the basic damage. Then, the attack power determined in step S44 is multiplied by the determined magnification, thereby determining the degree of final damage to be caused to the enemy character. In the above example, if the attack power is 15, the degree of final damage to be caused to the enemy character is determined by 15×2=30.

Following step S75, in step S76, an effect representation corresponding to the style of attack by the player character is displayed on the display screen (see FIGS. 8A and 8B). Image data for the effect representation is prestored for each attack style. In the following step S77, the enemy character's characteristic parameter (specifically, HP) is changed in accordance with the degree of the damage determined in step S75. Specifically, the CPU core 21 reduces the HP comprising the enemy character status data $22f$ stored in the WRAM 22 by the degree of the damage determined in step S75, thereby updating the HP. Note that the enemy character having HP targeted for updating is present in the area enclosed by the input trajectory (e.g. the enemy character is identified in step S74). After the process of step S77, the procedure of the flowchart shown in FIG. 21 is terminated.

Referring back to FIG. 10, after the process of step S46, the process of step S47 is performed. In step S47, it is determined whether a battle is completed. This determination is made based on, for example, whether the player character's HP or all enemy characters' HPs is/are reduced to zero. Specifically, if the player character's HP or all enemy characters' HPs is/are reduced to zero, it is determined that the battle is completed, and the battle process shown in FIG. 10 is terminated. On the other hand, if the player character's HP and any one enemy character's HP are not reduced to zero, it is determined that the battle is not completed, and the procedure returns to step S41. In this case, the processes of steps S41 through S47 are repeatedly performed until the battle is deemed to be completed. Thus, the description of the game process according to the present exemplary illustrative embodiment has been completed.

As described above, in a touch-panel type game apparatus according to the present exemplary illustrative embodiment, the style of attack can be changed in accordance with the shape of an input trajectory drawn on the display screen by the player's input. Accordingly, a game operation can be performed in various manners, and various styles of attack can be performed in a game. Moreover, it is possible to change a degree of an attack or a range targeted for attack in accordance with the size of the input trajectory or a range enclosed by the input trajectory, and therefore it is possible to diversify the pattern of attack.

Although the present exemplary illustrative embodiment has been described above with respect to operations of attacking enemy characters in battle scenes of a RPG, the present invention is not limited to such operations. For example, an exemplary illustrative embodiment is advantageous for use in operations of recovering or protecting the player character. Specifically, it is conceivable that the type of a recovery operation (e.g., an operation of recovering HP, an operation of allowing the player character to recover from a poisoned state, etc.) is changed in accordance with the shape of the input trajectory, and a degree of recovery (e.g., the amount of HP to be recovered) is changed in accordance with the size of the input trajectory.

Further, the present exemplary illustrative embodiment has been described above with respect to a case where an enemy character to be attacked is present in an area enclosed by the input trajectory. However, the present invention is not limited to this so long as the enemy character to be attacked is determined based on an area enclosed by the input trajectory. For example, only an enemy character, which is in contact with the input trajectory or located outside the area enclosed by the input trajectory, may be targeted for attack (e.g. the enemy character present in the area enclosed by the input trajectory is not attacked).

Figure 23:
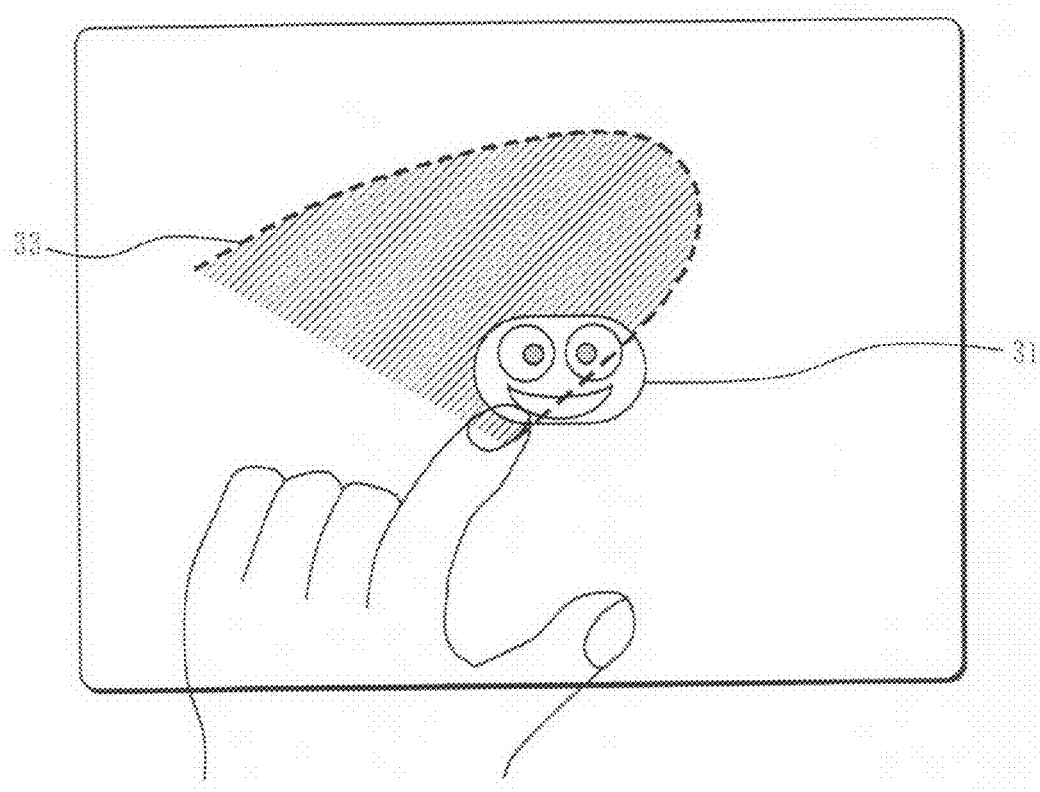
FIG. 23 is a diagram showing an exemplary game image where an input trajectory has an arc shape.
Figure 24:
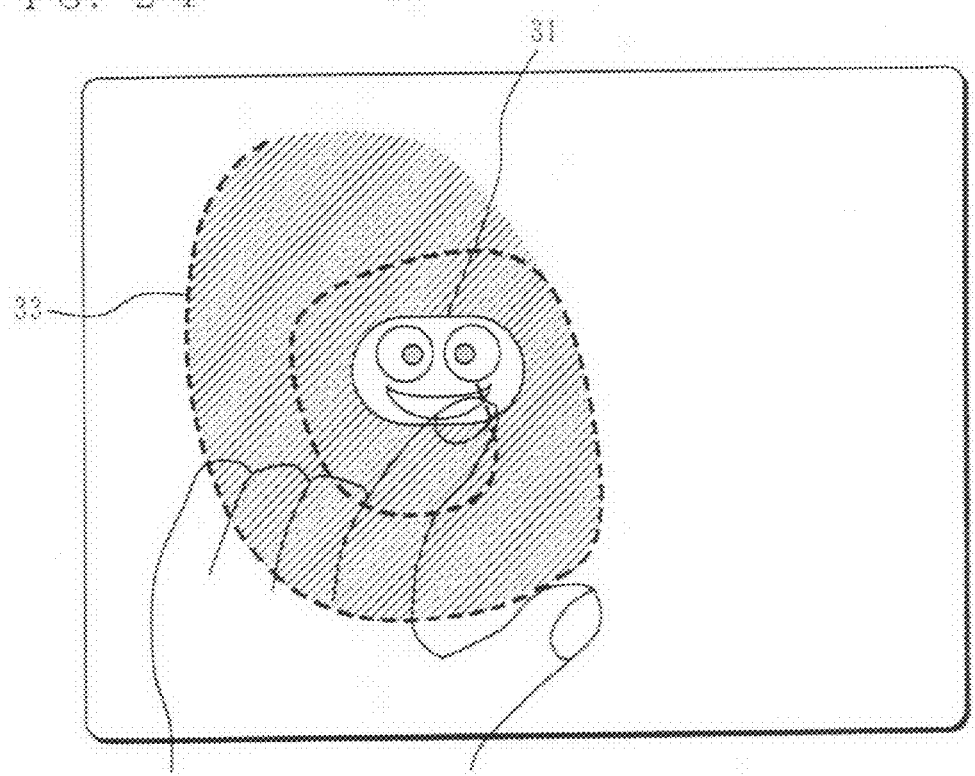
FIG. 24 is a diagram showing an exemplary game image where an input trajectory has a spiral shape.
Figure 25:
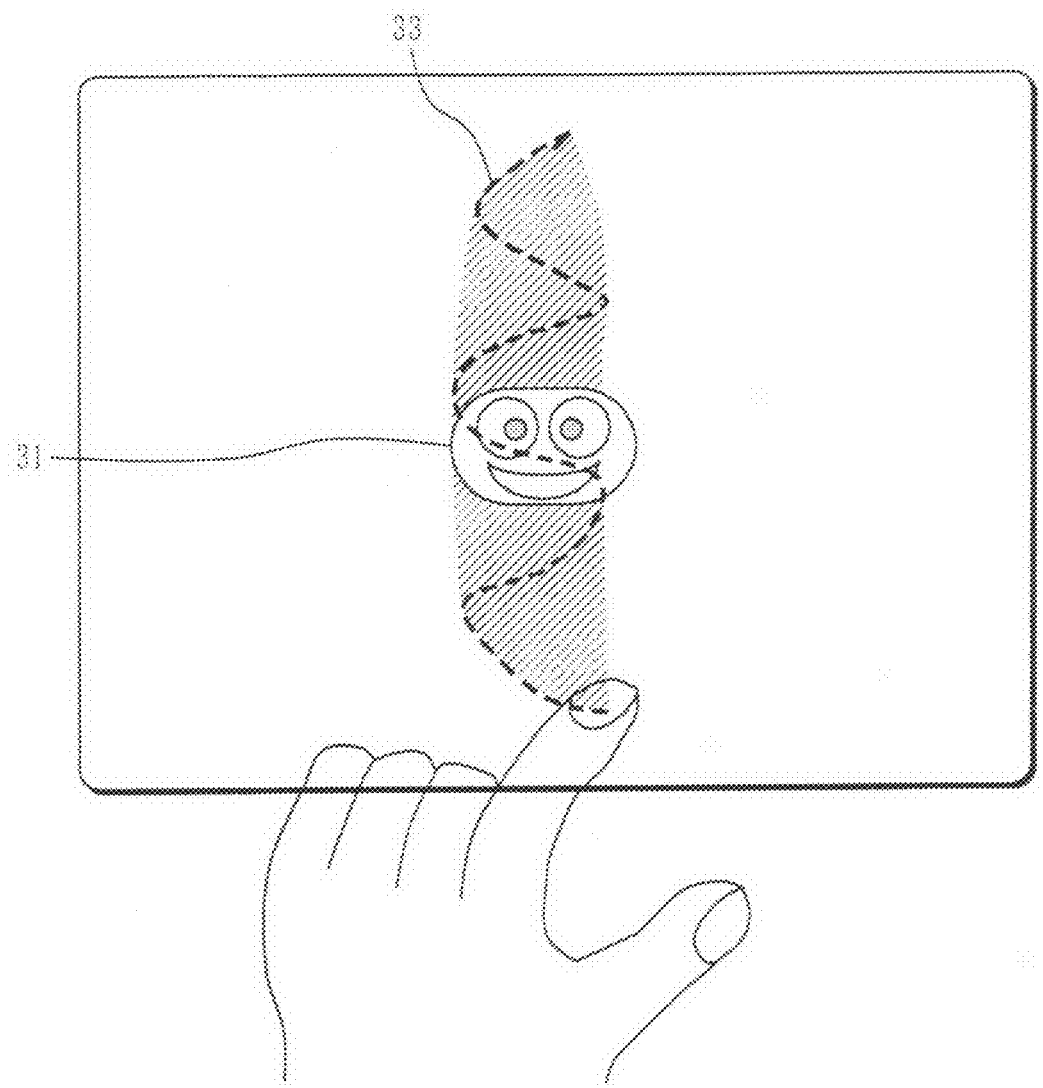
FIG. 25 is a diagram showing an exemplary game image where an input trajectory has an undulating shape.

Furthermore, the present exemplary illustrative embodiment has been described above with respect to a case where the reference graphic has a closed shape, such as a circle, a triangle, and a rectangle. However, the reference graphic does not have to have a closed shape. For example, the reference graphic may have an arc shape as shown in FIG. 23 or a spiral shape as shown in FIG. 24. Alternatively, the reference graphic may have an undulating shape as shown in FIG. 25. Note that in the case where the reference graphic does not have a closed shape, an area for determining a target for attack (in the above exemplary illustrative embodiment, the area enclosed by the input trajectory) cannot be determined based on the shape of the reference graphic. Accordingly, in this case, an area corresponding to a reference graphic and targeted for attack may be previously determined for each possible shape of the reference graphic. For example, in the shapes shown in FIGS. 23 through 25, a hatched portion may be determined as the area targeted for attack.

Figure 26:
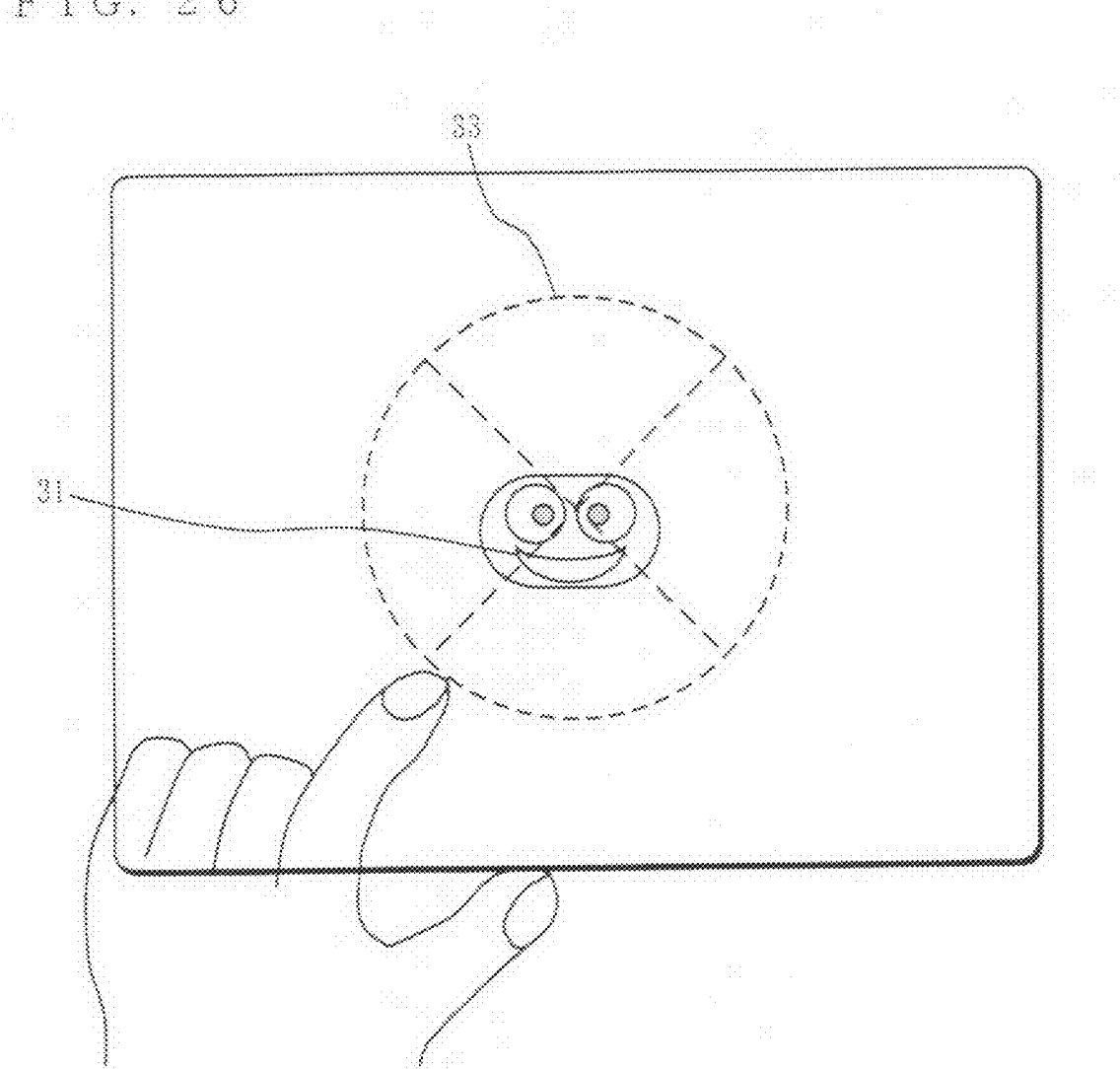
FIG. 26 is a diagram showing an exemplary game image where an input trajectory has a shape which cannot be drawn with one stroke.

Further still, the reference graphic does not have to have a shape which can be drawn with one stroke. For example, the reference graphic may have a shape made of a combination of a circle and straight lines as shown in FIG. 26. Note that in the case where the reference graphic has the shape shown in FIG. 26, if a trajectory which can be drawn by one continuous input operation is considered to be a single input trajectory (see step S57 of FIG. 11), it is not possible to draw the reference graphic because the shape shown in FIG. 26 cannot be drawn with one stroke. Accordingly, in this case, a trajectory inputted within a predetermined time period can be considered to be a single input trajectory. Specifically, in step S57 of FIG. 11, it may be determined whether the predetermined time period has elapsed after detection of an input in step S52.

In another exemplary illustrative embodiment, the damage to be caused to an enemy character may be changed in accordance with the number of enemy characters present in an area enclosed by the input trajectory. For example, if there is only one enemy character present in the area, the damage to be caused to that one enemy character may be greater than damage per enemy character for two enemy characters.

Figure 27:
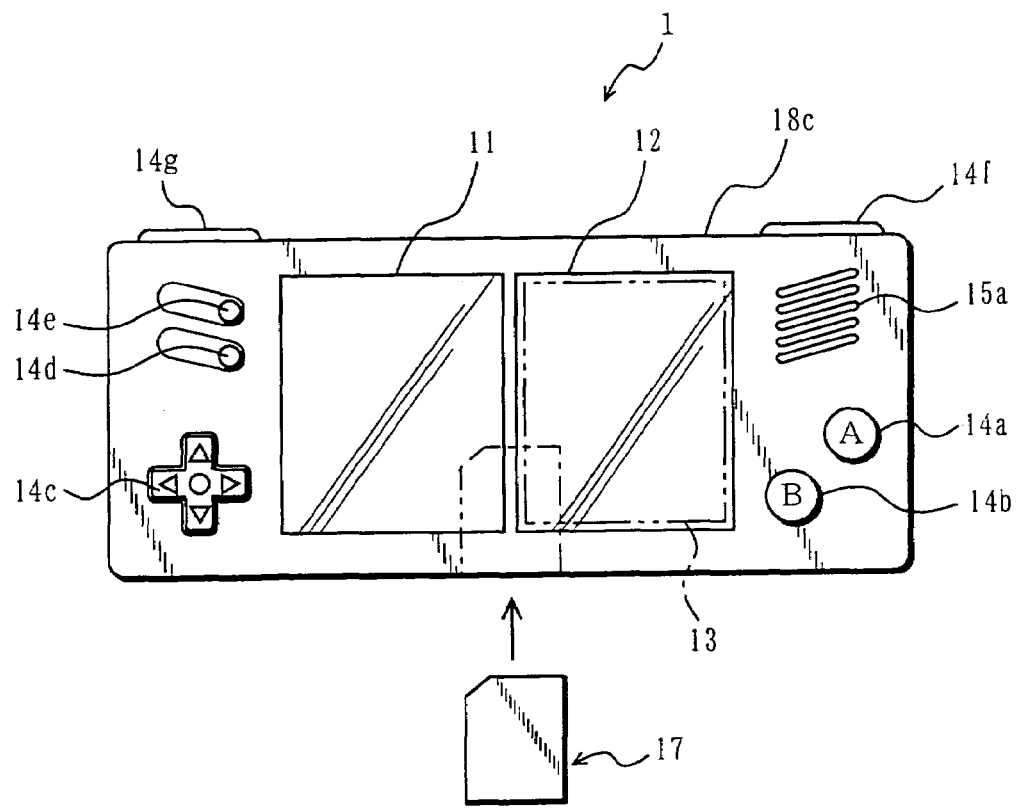
FIG. 27 shows a variation of a portable game apparatus.

Note that although an exemplary liquid crystal display section for simultaneously displaying two separate images has been described above with respect to a case where the two LCDs 11 and 12 are arranged so as to be physically separated in a vertical direction, the LCDs 11 and 12 may be arranged side by side in a horizontal direction without using the upper housing 18b. In order to arrange the LCDs 11 and 12 side by side in a horizontal direction, as shown in FIG. 27, a housing 18c having a wide rectangular shape may be provided so as to accommodate the LCDs 11 and 12 therein. In such a case, it is preferred that the LCD 12 having the touch panel 13 mounted thereon is located to the right of the LCD 11 because users frequently are right-handed. However, the LCDs 11 and 12 may be arranged the other way around in a portable game apparatus for a left-handed user.

Figure 28:
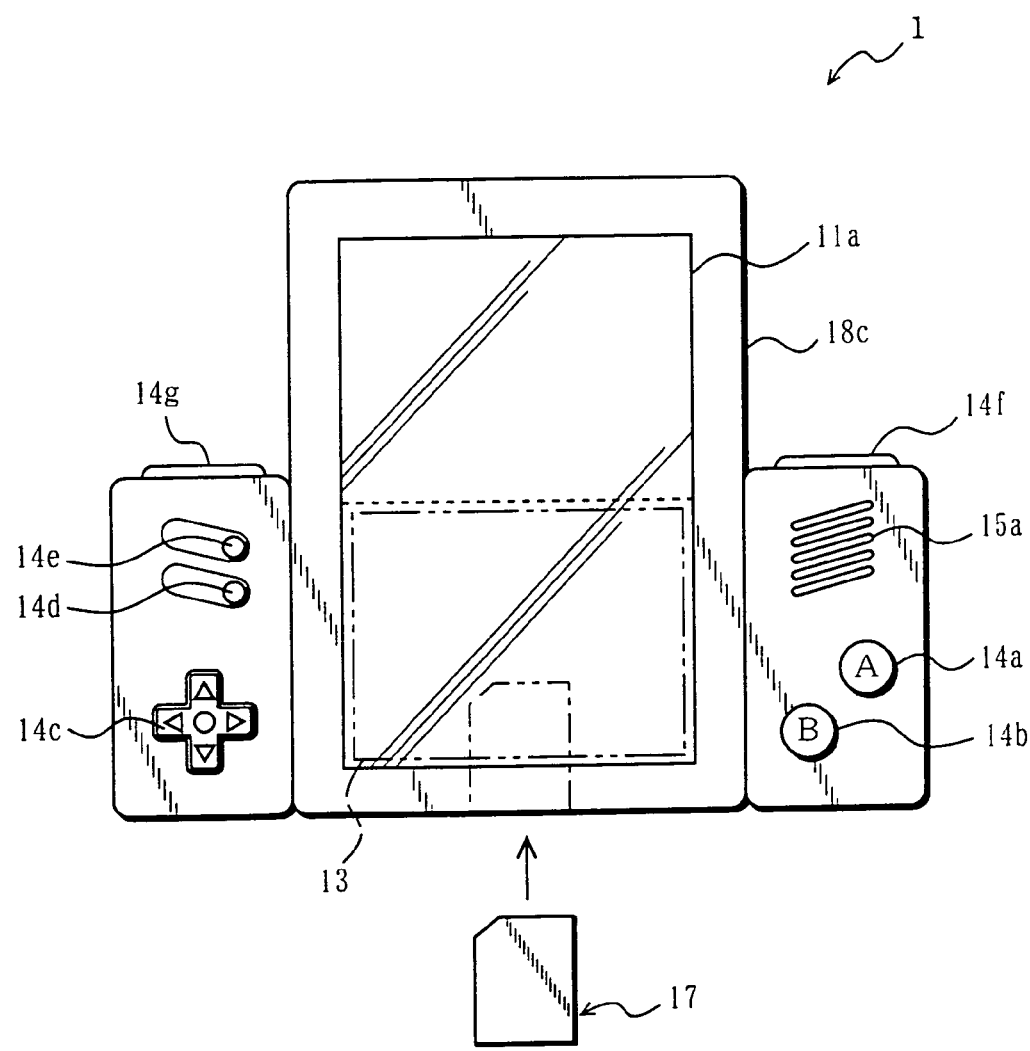
FIG. 28 shows another variation of the portable game apparatus.
Figure 29:
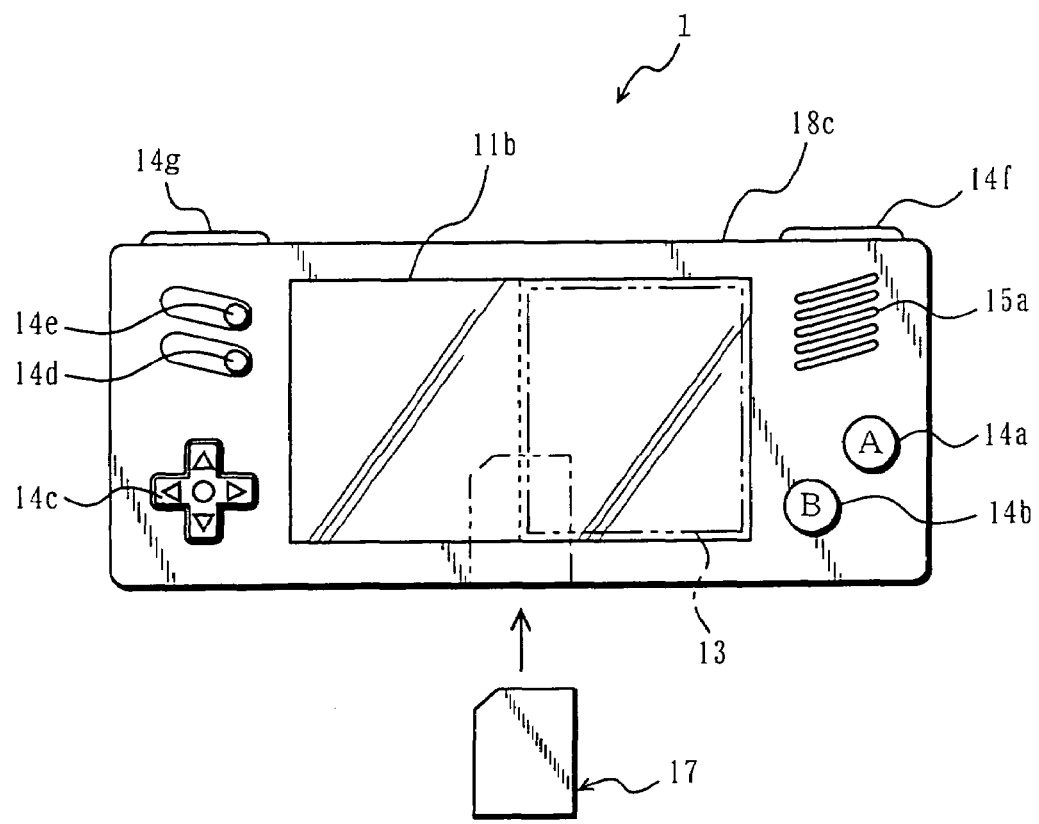
FIG. 29 shows still another variation of the portable game apparatus.

Further, instead of arranging the LCDs 11 and 12 so as to be physically separated in a vertical direction, an LCD 11a having a length twice the length of the LCD 11 and the same width as that of the LCD 11 as shown in FIG. 28 (i.e., the LCD 11a has physically one display screen having a size twice the size of the display screen of the LCD 11 in a vertical direction), may be provided so as to separately display two game images on the display screen (such that the two game images are adjacent to each other without a gap therebetween in a vertical direction). Alternatively, an LCD 11b having a width twice the width of the LCD 11 and the same length as that of the LCD 11 as shown in FIG. 29 (i.e., the LCD 11b has physically one display screen having a size twice the size of the display screen of the LCD 11 in a horizontal direction), may be provided so as to separately display two game images on the display screen (such that the two game images are adjacent to each other without a gap therebetween in a horizontal direction). In the examples of FIGS. 28 and 29, a plurality of game images can be separately displayed on one display screen.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A computer-readable storage medium having a game program stored therein, the game program causing a computer of a game apparatus, which generates a game image for display on a display screen, to implement a method comprising:
   a game image display control step of allowing a game image comprising one or more game characters to be displayed on the display screen;
   a coordinate detection step of detecting a coordinate value at specified time intervals, the coordinate value indicating a position on the display screen which is pointed to by a pointing device;
   a shape identification step of identifying a graphical shape of an input trajectory represented by a coordinate value group detected by the coordinate detection step;
   a size calculation step of calculating a size of the graphical shape of the input trajectory represented by the coordinate value group detected by the coordinate detection step;
   a basic condition determination step of determining an attack style for changing respective characteristic parameters of at least one attacked game character based on the graphical shape identified by the shape identification step, each characteristic parameter indicating a characteristic of the corresponding attacked game character;
   an effectiveness determination step of determining an effectiveness of the attack style on the at least one attacked game character based on the size calculated by the size calculating step; and
   a characteristic parameter change step of changing the characteristic parameter of the at least one attacked game character based on the attack style determined by the condition determination step and the attack effectiveness determined by the effectiveness determination step.

2. The storage medium according to claim 1,
   wherein the method further comprises a character selection step of selecting the at least one attacked game character from among the one or more game characters contained in the game image, and
   wherein the characteristic parameter change step changes only the characteristic parameter of the at least one attacked game character selected by the character selection step.

3. The storage medium according to claim 2, wherein the characteristic parameter change step changes a degree of change in the characteristic parameter in accordance with a number of the at least one game character selected by the character selection step.

4. The storage medium according to claim 1, wherein the method further comprises a change representation addition step of, after the graphical shape of the input trajectory is identified by the shape identification step, changing the game image in a different manner in accordance with a type of the basic condition determined by the graphical shape of the input trajectory.

5. The storage medium according to claim 1, wherein the method further comprises a trajectory display control step of displaying the input trajectory in a position on the display screen which corresponds to the coordinate value detected by the coordinate detection step.

6. The storage medium according to claim 1, wherein from among a plurality of pieces of reference graphics data stored in the game apparatus and indicating a type of the basic condition, the shape identification step selects a piece of reference graphics data, which indicates a shape most analogous to a shape represented by the coordinate value group, and the shape identification step determines the shape represented by the selected piece of reference graphics data as the graphical shape of the input trajectory.

7. The storage medium according to claim 6, wherein the method further comprises:
   a vector data group calculation step of calculating a vector data group indicating a distance and a direction between sequential coordinate values based on the coordinate value group detected by the coordinate detection step; and
   a correction step of correcting a plurality of sequential pieces of vector data indicating a same direction and contained in the vector data group, so as to be represented as a piece of vector data, and
   wherein the shape identification step selects a piece of reference graphics data indicating a shape most analogous to a shape of the vector data group corrected by the correction step.

8. A game apparatus comprising:
   the storage medium of claim 1; and a program implementing section for implementing a game program stored in the storage medium.

9. A computer-readable storage medium having a game program stored therein, the game program causing a computer of a game apparatus, which generates a game image for display on a display screen, to implement a method comprising:
   a game image display control step of allowing a game image comprising game characters to be displayed on the display screen;
   a coordinate detection step of detecting a coordinate value at specified time intervals, the coordinate value indicating a position on the display screen which is pointed to by a pointing device;
   a shape identification step of identifying a graphical shape of an input trajectory represented by a coordinate value group detected by the coordinate detection step;
   a character selection step of selecting for attack at least one game character having a characteristic parameter, which indicates a characteristic of the game character and is required to be changed, from among the game characters contained in the game image based on an area on the display screen which is defined by the input trajectory;
   a basic condition determination step of determining an attack style for changing the characteristic parameter, which indicates the characteristic of the attacked game character, based on the graphical shape identified by the shape identification step; and
   a characteristic parameter change step of changing the characteristic parameter of the at least one attacked game character selected by the character selection step, based on the attack style determined by the condition determination step.

10. The storage medium according to claim 9, wherein the method further comprises:
    a size calculation step of calculating a size of the graphical shape of the input trajectory represented by the coordinate value group detected by the coordinate detection step; and
    an effectiveness determination step of determining an effectiveness of the attack style on the at least one attacked game character based on the size calculated by the size calculating step, and
    wherein the characteristic parameter change step changes the characteristic parameter of the at least one game character based on the effectiveness of the attack style determined by the effectiveness determination step.

11. The storage medium according to claim 9, wherein the characteristic parameter change step changes a degree of change in the characteristic parameter in accordance with a number of the at least one game character selected by the character selection step.

12. The storage medium according to claim 9, wherein the method further comprises a change representation addition step for, after the graphical shape of the input trajectory is identified by the shape identification step, changing the game image in a different manner in accordance with a type of the basic condition determined by the graphical shape of the input trajectory.

13. The storage medium according to claim 9, wherein the method further comprises a trajectory display control step of displaying the input trajectory in a position on the display screen which corresponds to the coordinate value detected by the coordinate detection step.

14. The storage medium according to claim 9, wherein from among a plurality of pieces of reference graphics data stored in the game apparatus and indicating a type of the basic condition, the shape identification step selects a piece of reference graphics data, which indicates a shape most analogous to a shape represented by the coordinate value group, and the shape identification step determines the shape represented by the selected piece of reference graphics data as the graphical shape of the input trajectory.

15. The storage medium according to claim 14, wherein the method further comprises:
    a vector data group calculation step of calculating a vector data group indicating a distance and a direction between sequential coordinate values based on the coordinate value group detected by the coordinate detection step; and
    a correction step of correcting a plurality of sequential pieces of vector data indicating a same direction and contained in the vector data group, so as to be represented as a piece of vector data, and
    wherein the shape identification step selects a piece of reference graphics data indicating a shape most analogous to a shape of the vector data group corrected by the correction step.

16. A game apparatus comprising:
    the storage medium of claim 9; and
    a program implementing section for implementing a game program stored in the storage medium.

17. A method for changing a game parameter, the method being implemented by a computer of a game apparatus, which generates a game image for display on a display screen, the method comprising:
    a game image display control step of allowing a game image comprising game characters to be displayed on the display screen;
    a coordinate detection step of detecting a coordinate value at specified time intervals, the coordinate value indicating a position on the display screen which is pointed to by a pointing device;
    a shape identification step of identifying a graphical shape of an input trajectory represented by a coordinate value group detected by the coordinate detection step;
    a size calculation step of calculating a size of the graphical shape of the input trajectory represented by the coordinate value group detected by the coordinate detection step;
    a basic condition determination step of determining an attack style for changing a characteristic parameter of an attacked game character, which characteristic parameter indicates a characteristic of the attacked game character, based on the graphical shape identified by the shape identification step;
    an effectiveness determination step of determining an effectiveness of the attack style on the attacked game character based on the size calculated by the size calculating step; and
    a characteristic parameter change step of changing the characteristic parameter of the attacked game character based on the attack style determined by the condition determination step and the effectiveness of the attack style determined by the effectiveness determination step.

18. A method for changing a game parameter, the method being implemented by a computer of a game apparatus, which generates a game image for display on a display screen, the method comprising:
    a game image display control step of allowing a game image comprising game characters to be displayed on the display screen;

a coordinate detection step of detecting a coordinate value at specified time intervals, the coordinate value indicating a position on the display screen which is pointed to by a pointing device;

a shape identification step of identifying a graphical shape of an input trajectory represented by a coordinate value group detected by the coordinate detection step;

a character selection step of selecting for attack at least one game character having a characteristic parameter, which indicates a characteristic of the attacked game character and is required to be changed, from among the game characters based on an area on the display screen which is defined by the input trajectory;

a basic condition determination step of determining an attack style for changing the characteristic parameter, which indicates the characteristic of the attacked game character, based on the graphical shape identified by the shape identification step; and a characteristic parameter change step of changing the characteristic parameter of the game character selected for attack by the character selection step, based on the attack style determined by the condition determination step.

19. A computer readable storage medium having a game program stored therein, the game program causing a processor of a game apparatus, which generates a game image for display on a display screen, to implement a method comprising:

Determining a size and a shape of an attack input drawn on the display screen using an input device; and Changing one or more characteristics of an attacked game character based on one or both of the size and shape of the attack input.

20. The computer-readable storage medium according to claim 19, wherein the input comprises an input drawn around the attacked game character.

21. The computer-readable storage medium according to claim 19, wherein the input comprises an input drawn to touch the attacked game character.

22. The computer-readable storage medium according to claim 19, wherein the one or more characteristics comprise hit points (HP) of the attacked game character.

23. The computer-readable storage medium according to claim 19, wherein the one or more characteristics comprise magic points (MP) of the attacked game character.

24. The computer-readable storage medium according to claim 19, wherein the shape of the attack input is determined by comparison of the attack input with a plurality of pre-stored shapes.

25. The computer-readable storage medium according to claim 19, wherein the shape of the attack input is determined using vector data generated from the attack input.

* * * * *